US009485706B2

(12) United States Patent
Shinada et al.

(10) Patent No.: US 9,485,706 B2
(45) Date of Patent: Nov. 1, 2016

(54) MANAGEMENT APPARATUS AND METHOD FOR IDENTIFYING CANDIDATE FOR IMPROVING COMMUNICATION QUALITY; APPARATUS AND METHOD FOR IDENTIFYING COMMUNICATION PATH; NON-TRANSITORY COMPUTER-READABLE STORAGE MEDIUM STORING SUCH PROGRAMS; AND WIRELESS COMMUNICATION SYSTEM

(71) Applicant: FUJITSU LIMITED, Kawasaki-shi, Kanagawa (JP)

(72) Inventors: Yuki Shinada, Saitama (JP); Daisuke Nitta, Plano, TX (US); Tadanori Yokosawa, Yokosuka (JP); Takahiro Kawaguchi, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 14/446,825

(22) Filed: Jul. 30, 2014

(65) Prior Publication Data
US 2014/0341061 A1 Nov. 20, 2014

Related U.S. Application Data

(63) Continuation of application No. PCT/JP2012/055229, filed on Mar. 1, 2012.

(51) Int. Cl.
*H04W 40/00* (2009.01)
*H04W 4/12* (2009.01)
(Continued)

(52) U.S. Cl.
CPC ............ *H04W 40/12* (2013.01); *H04W 16/18* (2013.01); *H04W 24/08* (2013.01); *H04W 16/20* (2013.01); *H04W 24/10* (2013.01)

(58) Field of Classification Search
CPC ... H04W 24/00; H04W 80/04; H04W 84/12; H04W 40/00; H04W 40/12
See application file for complete search history.

(56) References Cited

U.S. PATENT DOCUMENTS

2002/0115448 A1 8/2002 Amerga et al.
2002/0198977 A1 12/2002 Cho
(Continued)

FOREIGN PATENT DOCUMENTS

EP 1613115 A1 1/2006
EP 2424293 A1 2/2012
(Continued)

OTHER PUBLICATIONS

JPOA—Japanese Office Action mailed on Jun. 2, 2015 for Japanese Application No. 2014-501912, with partial English translation of the relevant part.
(Continued)

*Primary Examiner* — Andrew Lee
(74) *Attorney, Agent, or Firm* — Fujitsu Patent Center

(57) ABSTRACT

A management apparatus that identifies a candidate for improving communication quality in a wireless communication system including a base station and a mobile station, the management apparatus comprising: an obtainer that obtains measured communication quality information and positional information from the mobile station; a communication quality estimator that estimates a communication quality based on the positional information obtained from the mobile station; a communication path determiner that identifies a communication path using the estimated communication quality estimated and the measured communication quality information; and a communication quality improvement candidate determiner that identifies the candidate for improving communication quality related to the communication path determined, the candidate being based on communication quality. A method and a program for identifying a candidate for improving communication quality, an apparatus, a method, and a program for determining a communication path, and a wireless communication system are also provided.

20 Claims, 26 Drawing Sheets

(51) Int. Cl.
*H04W 40/12* (2009.01)
*H04W 16/18* (2009.01)
*H04W 24/08* (2009.01)
*H04W 16/20* (2009.01)
*H04W 24/10* (2009.01)

(56) References Cited

U.S. PATENT DOCUMENTS

| | | |
|---|---|---|
| 2003/0216143 A1 | 11/2003 | Roese et al. |
| 2003/0216144 A1 | 11/2003 | Roese et al. |
| 2003/0217122 A1 | 11/2003 | Roese et al. |
| 2003/0217137 A1 | 11/2003 | Roese et al. |
| 2003/0217150 A1 | 11/2003 | Roese et al. |
| 2003/0217151 A1 | 11/2003 | Roese et al. |
| 2003/0225893 A1 | 12/2003 | Roese et al. |
| 2006/0019661 A1 | 1/2006 | Tanoue |
| 2006/0245406 A1* | 11/2006 | Shim ............... H04L 63/0272 370/338 |
| 2009/0046573 A1* | 2/2009 | Damnjanovic ....... H04W 36/30 370/216 |
| 2009/0290555 A1* | 11/2009 | Alpert ................ H04W 4/20 370/331 |
| 2010/0317374 A1* | 12/2010 | Alpert ................ H04W 68/02 455/458 |
| 2011/0003596 A1 | 1/2011 | Motoyoshi |
| 2011/0019576 A1 | 1/2011 | Kobayashi et al. |
| 2011/0059735 A1 | 3/2011 | Thiel et al. |
| 2011/0151864 A1 | 6/2011 | Byun et al. |
| 2011/0201347 A1* | 8/2011 | Abraham ............ H04W 48/18 455/456.1 |
| 2012/0028586 A1 | 2/2012 | Inaba |
| 2012/0100856 A1* | 4/2012 | Ishida ................ H04W 36/04 455/436 |
| 2012/0129517 A1* | 5/2012 | Fox .................... H04L 41/5025 455/425 |
| 2013/0115961 A1 | 5/2013 | Shibayama et al. |
| 2013/0190009 A1* | 7/2013 | Johansson ........... H04W 64/003 455/456.1 |
| 2015/0172993 A1* | 6/2015 | Jiang ................... H04W 40/20 455/406 |

FOREIGN PATENT DOCUMENTS

| | | |
|---|---|---|
| JP | 2003-18642 | 1/2003 |
| JP | 2004-518359 | 6/2004 |
| JP | 2005-539409 | 12/2005 |
| JP | 2006-20043 | 1/2006 |
| JP | 2012-34002 | 2/2012 |
| WO | 02/059638 A2 | 8/2002 |
| WO | 2009/119545 | 10/2009 |
| WO | 2012/011147 | 1/2012 |

OTHER PUBLICATIONS

International Search Report, mailed in connection with PCT/JP2012/055229 and mailed May 22, 2012.
EESR—Extended European Search Report issued on Dec. 14, 2015 for corresponding EP Application No. 12870203.2.

* cited by examiner

FIG. 4

| Large category | Middle category | Item | Example of value(unit) | Remarks |
|---|---|---|---|---|
| User ID | User ID | IMSI | 001 | ID to specify user |
| Date/Time of measurement | Date/Time of measurement | date | 2011/01/19 01:00:00 | Date/Time of receiving measured information |
| Positional information (ex: GPS information) | Latitude/ Longitude/ Altitude | latitudeSign | north | North latitude/ south latitude |
| | | latitude | 35° 39' 30.992" | latitude |
| | | longitude | 139° 44' 43.609" | Longitude |
| | | altitudeDirection | height | Altitude/depth |
| | | altitude | 10(m) | Altitude |
| LTE cell information #1 | Cell information | physCellId | 001 | ID to specify cell |
| | radio quality | rsrq-Result | -12.0(dB) | Degree of interference |
| | | rsrp-Result | -90(dBm) | Reception strength |
| LTE cell information #2 | the same items as those of above "LTE cell information #1" | | | |
| ⋮ | ⋮ | | | |
| LTE cell information #n | the same items as those of above "LTE cell information #1" | | | |
| 3G cell information #1 | Cell information | Cell Identity | 001 | ID to specify cell |
| | radio quality | CPICH Ec/N0 | -12.0(dB) | Degree of interference |
| | | CPICH RSCP | -90(dBm) | Reception strength |
| 3G cell information #2 | the same items as those of above "3G cell information #1" | | | |
| ⋮ | ⋮ | | | |
| 3G cell information #n | the same items as those of above "3G cell information #1" | | | |
| terminal type information | terminal type information | IMEI-SV | 001 | ID to specify terminal type |

141

| Large category | Middle category | Item | Example of value(unit) | Remarks |
|---|---|---|---|---|
| User ID | User ID | IMSI | 001 | ID to identify user |
| captured radio-wave status | WiFi | WiFi connection | present | WiFi-wave capturing status |

| Large category | Middle category | Item | Example of value(unit) | Remarks |
|---|---|---|---|---|
| User ID | User ID | IMSI | 001 | ID to specify user |
| Date/Time of measurement | Date/Time of measurement | date | 2011/01/19 01:00:00 | Date/Time of receiving measured information |
| Positional information (ex: GPS information) | Latitude/ Longitude/ Altitude | latitudeSign | north | latitude |
| | | latitude | 35° 39' 30.992" | latitude |
| | | longitude | 139° 44' 43.609" | Longitude |
| | | altitudeDirection | height | Altitude/depth |
| | | altitude | 10(m) | Altitude |
| 3G cell information #1 | Cell information | Cell Identity | 001 | ID to specify cell |
| | radio quality | CPICH Ec/N0 | −12.0(dB) | Degree of interference |
| | | CPICH RSCP | −90(dBm) | Reception strength |
| 3G cell information #2 | the same items as those of above "3G cell information #1" | | | |
| ⋮ | | | | |
| 3G cell information #n | the same items as those of above "3G cell information #1" | | | |
| terminal type information | terminal type information | IMEI-SV | 001 | ID to specify terminal type |

143

| Large category | Middle category | Item | Example of value(unit) | Remarks |
|---|---|---|---|---|
| User ID | User ID | IMSI | 001 | ID to identify user |
| captured radio-wave status | WiFi | WiFi connection | present | WiFi-wave capturing status |
|  |  |  |  |  |

| User ID | Date/Time of measurement | LTE cell information #1 | | ...#n | 3G cell information #1 | | | ...#n | Radio-wave capturing status | |
|---|---|---|---|---|---|---|---|---|---|---|
| | | physCellId | rsrq-Result / rsrp-Result | | Cell Identity | CPICH Ec/N0 | CPICH RSCP | | WiFi#1 | WiFi#2 |
| 001 | 2011/01/19 01:00:00 | 001 | -12.0(dB) / -90(dBm) | ... | 001 | -12.0(dB) | -90(dBm) | ... | Present | Absent |
| 002 | 2011/01/19 01:00:00 | | | ... | 001 | -12.0(dB) | -90(dBm) | ... | Absent | Absent |
| 003 | 2010/12/19 01:00:00 | | | ... | 001 | -12.0(dB) | -90(dBm) | ... | Absent | Absent |
| ... | ... | ... | ... | ... | ... | ... | ... | ... | ... | ... |
| 001 | 2011/01/19 01:00:00 | 001 | -12.0(dB) / -90(dBm) | ... | 001 | -12.0(dB) | -90(dBm) | ... | Present | Absent |
| 002 | 2011/01/19 01:00:00 | | | ... | 001 | -12.0(dB) | -90(dBm) | ... | Absent | Absent |
| 003 | 2011/01/25 01:00:00 | | | ... | 001 | -12.0(dB) | -90(dBm) | ... | Absent | Absent |

| Base station name | Type | Latitude/ longitude/ altitude | Example of value (unit) |
|---|---|---|---|
| A | Macro base station | North latitude/ south latitude | north |
| | | latitude | 35° 39' 30.992" |
| | | longitude | 139° 44' 43.609" |
| | | Altitude/depth | height |
| | | Altitude | 10(m) |
| | | Transmission power | −90(dBm) |
| | | Communication frequency | 800MHz |
| | | Tilt angle | 15 degrees |
| | | Sector direction | |
| B | Repeater | North latitude/ south latitude | north |
| | | latitude | 35° 39' 30.992" |
| | | longitude | 139° 44' 43.609" |
| | | Altitude/depth | height |
| | | Altitude(BS) | 10(m) |
| | | Altitude(MS) | 14(m) |
| | | Transmission power | −90(dBm) |
| | | Communication frequency | 1.5GHz |
| | | mount angle of BS antenna | 90 degrees |
| | | mount angle of MS antenna | 270 degrees |
| | | sector direction | |
| | | | |

| Parameter | Example of value (unit) | Remarks |
|---|---|---|
| Base station | A | Communication path |
| Relay 1 | A | If a relay such as a repeater is disposed, a value is set in this parameter |
| Relay 2 | Absent | |
| ... | | |
| Rate 1 of area occupied by buildings | 5.5(%) | Rate of area occupied by buildings between base station and relay or between relays |
| Rate 2 of area occupied by buildings | —(%) | |
| ... | | |
| Area accommodating mobile station | Indoor | Area accommodating mobile station (indoor/outdoor) |

| Return value from path retrieving function | Result of indoor/ outdoor determination | Area accommodating mobile terminal |
|---|---|---|
| indoor | indoor | indoor |
| indoor | outdoor | outdoor |
| outdoor | indoor | indoor |
| outdoor | outdoor | outdoor |

FIG. 15

| Frequency(MHz)<br>Construction material (thickness) | 920 | 1450 | 2200 |
|---|---|---|---|
| Wooden board(15mm) | 2.6 | 2.7 | 3.5 |
| Gypsum board(7mm) | 0.3 | 0.2 | 0.1 |
| Brick(60mm) | 1.3 | 0.8 | 1.4 |
| Brick (water-containing) | 1.9 | 3.1 | 5.8 |
| Roof tile(15mm) | 1.1 | 3.3 | 8.1 |
| ALC(100mm) | 4.9 | 7.6 | 10.9 |
| Thermal barrier film | 22.6 | 22.3 | 25.2 |
| Heat-insulating Fiberglass | 36.1 | 38.6 | 37.1 |

| Device name | Latitude/<br>longitude/<br>altitude | Example of value<br>(unit) |
|---|---|---|
| A | North latitude/<br>south latitude | north |
| | latitude | 35° 39' 30.992" |
| | longitude | 139° 44' 43.609" |
| | Altitude/depth | height |
| | Altitude(BS) | 10(m) |
| | Altitude(MS) | 14(m) |
| | Transmission power | −90(dBm) |
| | Communication<br>frequency | 1.5GHz |
| | mount angle of<br>BS antenna | 90 degrees |
| | mount angle of<br>MS antenna | 270 degrees |
| | sector direction | |

| Starting point | relay 1 | relay 2 | ... | End point | Attenuation rate |
|---|---|---|---|---|---|
| base station A | | | | mobile station A | 10dB |
| base station A | relay A | | | mobile station B | 3dB |
| base station A | relay A | relay B | | mobile station C | 1dB |
| base station A | | | | mobile station D | 3dB |
| base station A | relay A | | | mobile station E | 7dB |
| base station A | | | | mobile station F | 1dB |
| ... | | | | ... | |

| Starting point | relay 1 | | | relay 2 | | | ... | End point (mobile station) | | Attenuation rate |
|---|---|---|---|---|---|---|---|---|---|---|
| | Attenuation rate | Device number | Amplification rate | Attenuation rate | Device number | Amplification rate | | Attenuation rate | Number | |
| base station A | | | | | | | | | | |
| base station A | | relay A | 10 (1) | | | | | 10 (2) | mobile station A | 10dB |
| base station A | | relay A | 10 (1) | | relay B | 7 (1) | | | mobile station B | 3dB |
| base station A | | | | | | | | | mobile station C | 1dB |
| base station A | | | | | | | | 3 (2) | mobile station D | 3dB |
| base station A | | relay A | 10 (1) | | | | | 7 (2) | mobile station E | 7dB |
| base station A | | | | | | | | | mobile station F | 1dB |
| ... | | | | | | | | | ... | |

| Starting point | relay 1 | | | relay 2 | | | ... | End point (mobile station) | | Attenuation rate |
|---|---|---|---|---|---|---|---|---|---|---|
| | Attenuation rate | Device number | Amplification rate | Attenuation rate | Device number | Amplification rate | | Attenuation rate | Number | |
| base station A | | | | | | | | 10 (2) | mobile station A | 10dB |
| base station A | 7 (3) | relay A | 10 (1) | | | | | 6 (4) | mobile station B | 3dB |
| base station A | 7 (3) | relay A | 10 (1) | | relay B | 7 (1) | | | mobile station C | 1dB |
| base station A | | | | | | | | 3 (2) | mobile station D | 3dB |
| base station A | | | | | | | | 7 (2) | mobile station E | 7dB |
| base station A | 7 (3) | relay A | 10 (1) | | | | | 4 (4) | mobile station F | 1dB |
| ... | | | | | | | | | ... | |

| Starting point | relay 1 | | | relay 2 | | | ... | End point (mobile station) | | | Attenuation rate |
|---|---|---|---|---|---|---|---|---|---|---|---|
| | Attenuation rate | Device number | Amplification rate | Attenuation rate | Device number | Amplification rate | | Attenuation rate | Number | | |
| base station A | | | | | | | | 10 (2) | mobile station A | | 10dB |
| base station A | 7 (3) | relay A | 10 (1) | | | | | 3 (4) | mobile station B | | 3dB |
| base station A | 7 (3) | relay A | 10 (1) | 4 (5) | relay B | 7 (1) | | 7 (6) | mobile station C | | 1dB |
| base station A | | | | | | | | 3 (2) | mobile station D | | 3dB |
| base station A | 7 (3) | relay A | 10 (1) | | | | | 7 (2) | mobile station E | | 7dB |
| base station A | | | | | | | | 4 (4) | mobile station F | | 1dB |
| ... | | | | | | | | | ... | | |

25

MANAGEMENT APPARATUS AND METHOD FOR IDENTIFYING CANDIDATE FOR IMPROVING COMMUNICATION QUALITY; APPARATUS AND METHOD FOR IDENTIFYING COMMUNICATION PATH; NON-TRANSITORY COMPUTER-READABLE STORAGE MEDIUM STORING SUCH PROGRAMS; AND WIRELESS COMMUNICATION SYSTEM

CROSS-REFERENCE TO RELATED APPLICATION

This application is a continuation application of International Application PCT/JP2012/055229 filed on Mar. 1, 2012 and designated the U.S., the entire contents of which are incorporated herein by reference.

FIELD

The embodiments discussed herein are a management apparatus that identifies a candidate for improving communication quality in a wireless communication system including a base station and a mobile station, a method of identifying a candidate for improving communication quality, a non-transitory storage medium having stored therein a program for identifying a candidate for improving communication quality, an apparatus for determining a communication path, a method of determining a communication path, a non-transitory storage medium having stored therein a program for determining a communication path, and a wireless communication system.

BACKGROUND

Improvement in communication quality in a wireless communication system is an important issue for wireless communication carriers to achieve a mobile telephone no matter where the telephone is.

One of the factors that affect the communication quality in a wireless communication system is varying radio quality with the position of a mobile station. Besides, the communication quality of a mobile station is affected by distance to the base station, blocker, radio-wave reflection, radio-wave interference, base station, transmission power, and others.

For the above, wireless communication carriers make attempts of improving communication quality through, for example, measuring communication quality with a radio-wave measuring car or by a person of a wireless communication carrier visiting the site in response to report from a user and determining an area that needs improvement in communication quality.

Concurrently, wireless communication carriers are proceeding installation of radio-waver amplifiers such as repeaters contributing to improvement in wireless communication quality. A radio-wave amplifier amplifies radio wave received from the base station and transmits the amplified radio wave to a blind areas such as underground space which radio wave has not conventionally reached. Installation of radio-wave amplifiers efficiently improves area quality at low costs.

In recent years, WiFi connection provided by a wireless LAN hot spot has gained attentions as one of the solutions to enlarge a cover area of an indoor or underground area. WiFi connection is capable of improving communication quality degraded mainly by a blocker. NTT Communications provides 4,000 hot spots serving as public WiFi over the country, and these hot spots are intensively arranged at points where lots of people gather, such as near stations.

Another solution to improve the radio quality is indoor/outdoor determination that determines whether a mobile station is located indoor or outdoor. The accuracy of the indoor/outdoor determination is enhanced by using map data based on positional information obtained from a mobile station, so that the mobile station is determined to be in an indoor or outdoor area.

In order to consider a radio-wave amplifier such as a repeater, the position of a radio-wave amplifier and a propagation loss and a propagation delay that are estimated are registered in a base station in advance. Using these pieces of information registered in the base station and the propagation loss value and the propagation delay that a mobile station measures, determination is made as to whether the mobile station is accommodated in the service area of the repeater.

[Patent Literature 1] Japanese Laid-open Patent Publication No. 2006-20043

[Patent Literature 2] Japanese National Publication of International Patent Application No. 2005-539409

A conventional method of determining an area communication quality of which is to be improved takes time and labor because a person of the communication carrier visits the site and measures the radio quality. Furthermore, this method is capable of determining an area having poor radio quality but is incapable of determining which path has poor radio quality in the determined area.

In determining the position of the radio-wave amplifier, the propagation loss value and the propagation delay of a mobile station are used. In the 3rd Generation Partnership Project (3GPP) standard, a message (MeasurementReport (TS 25.331)) receivable when the position of the mobile station is registered provide the propagation loss but not the propagation delay.

A radio-wave amplifier that the base station has not register may be installed inside a store. The base station does not recognize the installation parameters of such a radio-wave amplifier not being registered.

Indoor/outdoor determination using map data may be erroneously resulted because old map data not updated is used. Further, this determination has a difficulty in determining the detailed position of the mobile station, and the error in determination may not attain the correct result.

SUMMARY

As an aspect of the embodiments, there is provided a management apparatus that identifies a candidate for improving communication quality in a wireless communication system including a base station and a mobile station, the management apparatus including: an obtainer that obtains measured communication quality information and positional information from the mobile station; a communication quality estimator that estimates a communication quality based on the positional information obtained from the mobile station; a communication path determiner that identifies a communication path using the estimated communication quality estimated by the communication quality estimator and the measured communication quality information obtained by the obtainer; and a communication quality improvement candidate determiner that identifies the candidate for improving communication quality related to the communication path determined by the communication path determiner, the candidate being based on communication quality.

As another aspect of the embodiments, there is provided a method of identifying a candidate for improving communication quality in a wireless communication system including a base station and a mobile station, the method including: obtaining measured communication quality information and positional information from the mobile station; estimating communication quality based on the positional information obtained from the mobile station; identifying a communication path using the estimated communication quality and the measured communication quality information obtained; and identifying the candidate for improving quality related to the determined communication path, the candidate being based on communication quality.

As an additional aspect of the embodiments, there is provided a computer-readable storage medium having stored therein a program for causing a computer to execute a process for identifying a candidate for improving communication quality in a wireless communication system including a base station and a mobile station, the process including obtaining measured communication quality information and positional information from the mobile station; estimating communication quality based on the positional information obtained from the mobile station; identifying a communication path using the estimated communication quality and the measured communication quality information; and identifying the candidate for improving communication quality related to the determined communication path, the candidate being based on communication quality.

As a further aspect of the embodiments, there is provided an apparatus for determining a communication path in a wireless communication system including a base station and a mobile station, the apparatus including: an obtainer that obtains measured communication quality information and positional information from the mobile station; a communication quality estimator that estimates a communication quality based on the positional information obtained from the mobile station; and a communication path determiner that identifies a communication path using the estimated communication quality estimated by the communication quality estimator and the measured communication quality information obtained by the obtainer.

As a still further aspect of the embodiments, there is provided a method of determining a communication path in a wireless communication system including a base station and a mobile station, the method including obtaining measured communication quality information and positional information from the mobile station; estimating communication quality based on the positional information obtained from the mobile station; and identifying a communication path using the estimated communication quality and the measured communication quality information.

As a still further aspect of the embodiments, there is provided a computer-readable storage medium having stored therein a program for causing a computer to execute a process to determine a communication path in a wireless communication system including a base station and a mobile station, the process including: obtaining measured communication quality information and positional information from the mobile station; estimating communication quality based on the positional information obtained from the mobile station; and identifying a communication path using the estimated communication quality and the measured communication quality information.

As a still further aspect of the embodiments, there is provided a wireless communication system including a base station and a mobile station including: an obtainer that obtains measured communication quality information and positional information from the mobile station; a communication quality estimator that estimates a communication quality based on the positional information obtained from the mobile station; a communication path determiner that identifies a communication path using the estimated communication quality estimated by the communication quality estimator and the measured communication quality information obtained by the obtainer; and a communication quality improvement candidate determiner that identifies the candidate for improving communication quality related to the communication path determined by the communication path determiner, the candidate being based on communication quality.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of the format of mobile station information sent from an LTE system of an example of the first embodiment;

FIG. 6 is a diagram illustrating an example of the format of user information sent from a 3G system of an example of the first embodiment;

FIG. 8 is a diagram illustrating an example of the data format of a measured value DB of an example of the first embodiment;

FIG. 9 is a diagram illustrating an example of the data format of a base station information database (DB) of an example of the first embodiment;

FIG. 11 is a diagram illustrating an example of the format of response information from a path searcher of an example of the first embodiment;

FIG. 13 is a diagram illustrating an example of determination of an area accommodating a mobile station in an example of the first embodiment;

FIG. 15 is a diagram illustrating examples of a transmission loss of construction material of an example of the first embodiment;

FIG. 18 is a diagram illustrating an example of the format of a to-be-improved area DB in an example of the first embodiment;

FIG. 20 is a diagram illustrating an example of the format of determining a to-be-improved area in an example of the first embodiment;

FIG. 21 is a diagram illustrating an example of the format of determining a to-be-improved area in an example of the first embodiment;

FIG. 22 is a diagram illustrating an example of the format of determining a to-be-improved area in an example of the first embodiment;

DESCRIPTION OF EMBODIMENTS

Hereinafter, embodiments of this disclosure will now be described with reference to accompanying drawings. It is appreciated that the following embodiments are merely examples and there is no intention to exclude various modifications and application of other techniques not being mentioned in the following embodiments. The embodiments can be modified (e.g., combining the embodiments and modifications) without departing from the gist of the embodiments.

Hereinafter, description will now be made in relation to a management apparatus that identifies a candidate for improving communication quality in a wireless communication system including a base station and a mobile station, a method of identifying a candidate for improving communication quality, a non-transitory storage medium having stored therein a program for identifying a candidate for improving communication quality, an apparatus for determining a communication path, and a non-transitory storage medium having stored therein a program for determining a communication path.

The respective drawings may include additional functions to the elements appearing therein.

(1) First Embodiment (1-1) Configurations

Figure 1:
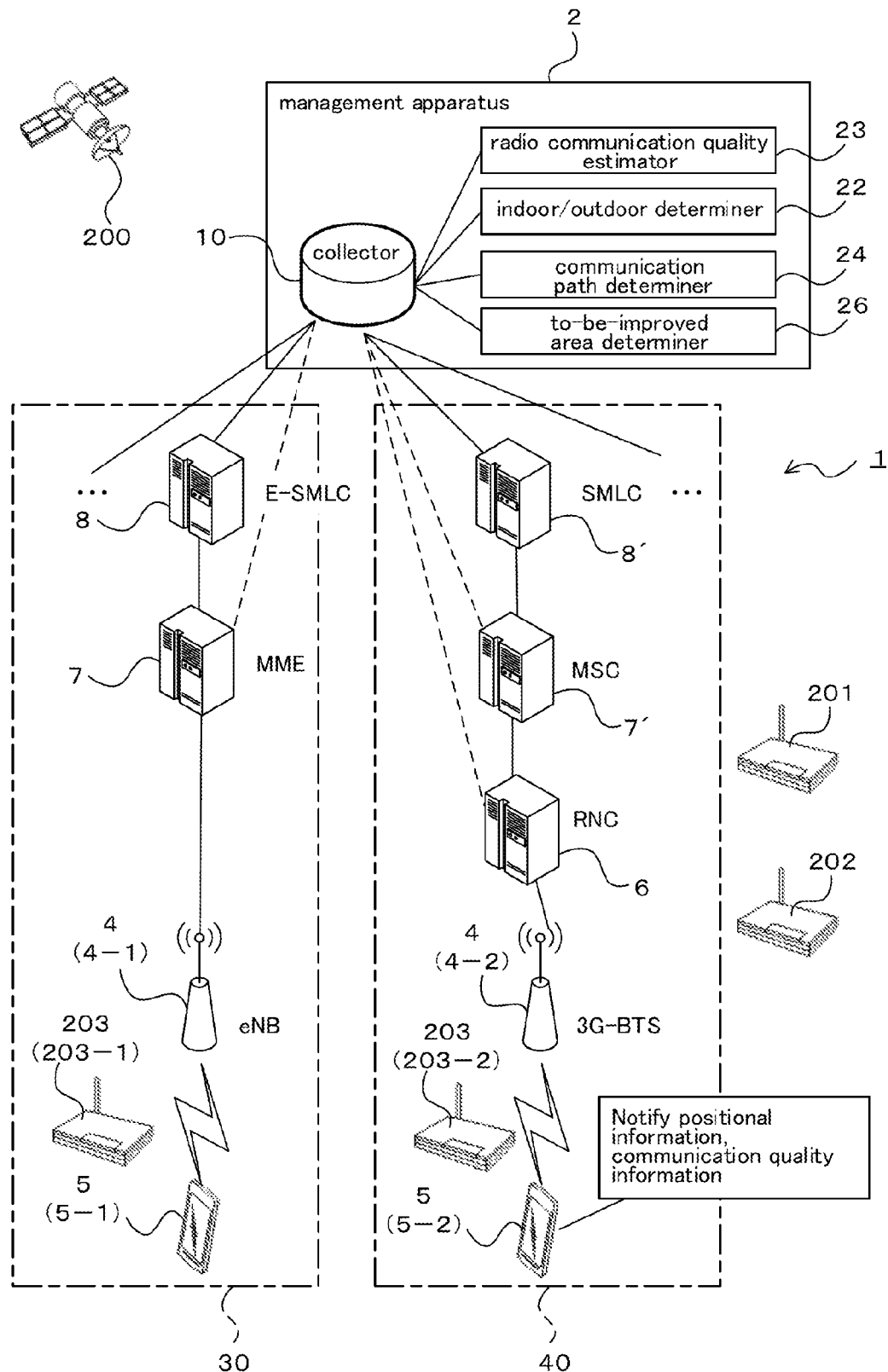
FIG. 1 is a diagram schematically illustrating the system configurations of a wireless communication system and a management apparatus according to an example of a first embodiment.

FIG. 1 is a diagram schematically illustrating the system configurations of a wireless communication system 1 and a management apparatus 2 according to an example of the first embodiment.

The management apparatus 2 of an example of the first embodiment is included in the wireless communication system 1, which includes a Long Term Evolution (LTE) system 30 and a 3G system 40.

In the wireless communication system 1, the management apparatus 2 identifies an area and/or a path radio communication quality of which is to be improved (hereinafter such an area and/or a path are referred to as candidates for improving communication quality).

Hereinafter, examples of the LTE system 30 and the 3G system 40 are assumed to be a system confirming to 3GPP and a Wideband Code Division Multiple Access (CDMA) system, respectively. Alternatively, the LTE system 30 and the 3G system 40 are not limited to the above and may be any systems confirming to other standards.

An example of the LTE system 30 is a node that deals with positional information for LTE and that is exemplified by an Evolved Serving Mobile Location Centre (E-SMLC) or an MME defined in 3GPP or is alternatively an entire system consisting of the above nodes.

The LTE system 30 is capable of wirelessly communicating with, for example, a mobile station 5-1 and includes an indoor LTE wireless base station (hereinafter also referred to as an eNB or a base station) 4-1, a Mobility Management Entity (MME) 7, and an E-SMLC 8. These functional units are typical in an LTE system, so description of the configurations and the functions thereof is omitted here.

The LTE system 30 may include one or more radio-wave amplifiers 203-1 such as repeaters interposed between the mobile station 5-1 and the base station 4-1. A radio-wave amplifier 203-1 amplitudes radio wave sent from the base station 4-1 and transmits the amplified radio wave. The base station 4-1 holds information of each radio-wave amplifier 203-1 accommodated in the area covered by the base station 4-1.

An example of the 3G system 40 is a node such as SMLC that deals with positional information for 3G or a 3G node such as an MSC and RNC that are defined in 3GPP, or is alternatively an entire system consisting of the above nodes.

The 3G system 40 is capable of wirelessly communicating with, for example, a mobile station 5-2 and includes a 3G base station (hereinafter also referred to as a base station) 4-2, a Radio Network Controller (RNC) 6, a Mobile Switching Centre (MSC) 7', and an SMLC 8'. These functional units are typical in a 3G system, so description of the configurations and the functions thereof is omitted here.

The 3G system 40 may include one or more radio-wave amplifiers 203-2 such as repeaters interposed between the mobile station 5-2 and the base station 4-2. A radio-wave amplifier 203-2 amplitudes radio wave sent from the base station 4-2 and transmits the amplified radio wave. The base station 4-2 holds information of each radio-wave amplifier 203-2 accommodated in the area covered by the base station 4-2.

Hereinafter, one of multiple base stations is determined by a Reference Numeral 4-1 or 4-2 while an arbitrary base station is represented by a Reference Numeral 4.

Likewise, one of multiple mobile stations is determined by a Reference Numeral 5-1 or 5-2 while an arbitrary mobile station is represented by a Reference Numeral 5.

Likewise, one of multiple radio-wave amplifiers is determined by a Reference Numeral 203-1 or 203-2 while an arbitrary radio-wave amplifier is represented by a Reference Numeral 203.

A mobile station 5 notifies a base station 4 of positional information of the device and communication quality information (e.g., a communication frequency, reception strength, and a Pathloss value).

The management apparatus 2 includes a collector (obtainer) 10, an indoor/outdoor determiner 22, a radio communication quality estimator (communication quality estimator) 23, a communication path determiner 24, and a to-be-improved area determiner (communication improvement candidate determiner) 26, which will be detailed below by referring to FIG. 2.

A mobile terminal 5 may be communicable with either one of the LTE system 30 and the 3G system 40, or may be a hybrid (dual) mobile station that is communicable with both the LTE system 30 and the 3G system 40.

The mobile station 5 may be able to obtain radio waves from a Global Positioning System (GPS) system 200, an indoor small wireless base station 201, and/or a WiFi router 202.

Figure 2:
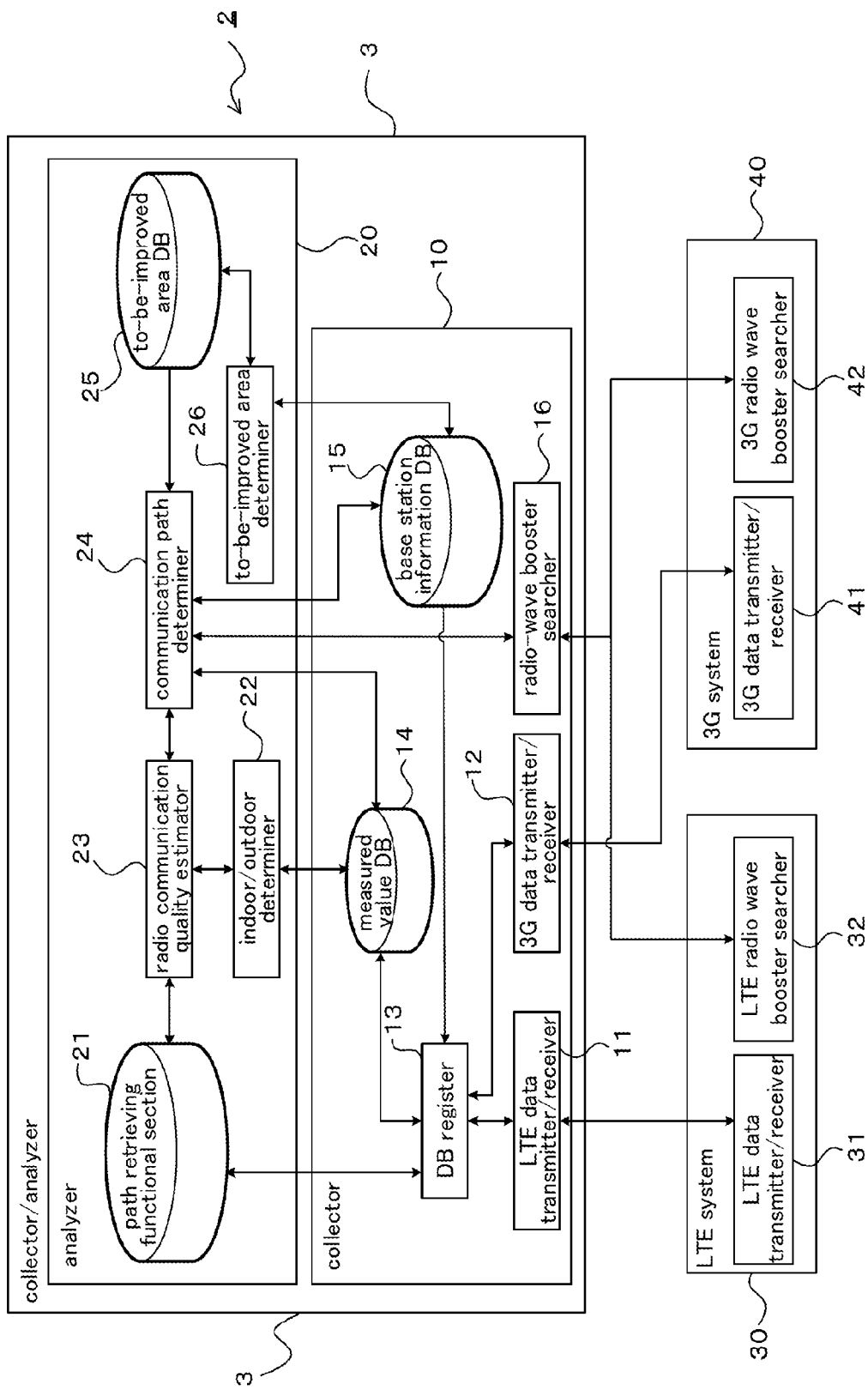
FIG. 2 is a block diagram schematically illustrating the function of a management apparatus of an example of the first embodiment.

FIG. 2 is a block diagram schematically illustrating the functions of the management apparatus 2 in an example of the first embodiment.

The management apparatus 2 configures a database storing user information, and includes a collector/analyzer 3 that identifies an area radio quality of which is to be improved through analyzing the data in the database.

The collector/analyzer 3 includes a collector 10 and an analyzer 20.

The collector 10 collects data from the LTE system 30 and the 3G system 40, and stores the collected data into appropriate databases.

The collector 10 includes an LTE data transmitter/receiver 11, a 3G data transmitter/receiver 12, a database (DB) register 13, a measured value DB 14, a base station information DB 15, and a radio-wave amplifier searcher 16.

The LTE data transmitter/receiver 11 receives mobile station information (positional data and radio quality information, such as the communication frequency, the reception strength, and a pathloss value), from a LTE data transmitter/receiver 31 of the LTE system 30 (described later). Hereinafter, the radio quality information is referred to as measured communication quality information. For example, the LTE data transmitter/receiver 11 obtains, for example, positional information and communication quality of the mobile station 5 from a message (Measurement Report) defined in 3GPP. In response to receiving such mobile station information, the LTE data transmitter/receiver 11 transmits a request for obtaining radio-wave capturing status from a wireless LAN (second communication system) such as WiFi to an LTE data transmitter/receiver 31 (described later).

The 3G data transmitter/receiver 12 receives mobile station information (positional data, radio quality information, such as the communication frequency, the reception strength, and a pathloss value), from a 3G data transmitter/receiver 41 of the 3G system 40 (described later). Hereinafter, the radio quality information is referred to as measured communication quality information. For example, the 3G data transmitter/receiver 12 obtains, for example, positional information and communication quality of the mobile station 5 from a message (Measurement Report) defined in 3GPP. In response to receiving such mobile station information, the 3G data transmitter/receiver 12 transmits a request for obtaining radio-wave capturing status from a wireless LAN (second communication system) such as WiFi to a 3G data transmitter/receiver 41 (described later).

The DB register 13 stores the mobile station information received by the LTE data transmitter/receiver 11 or the 3G data transmitter/receiver 12 into the measured value DB 14 and notifies the received mobile station information of the path searcher 21 of the analyzer 20 (described later).

The measured value DB 14 stores therein statistic information of the mobile station information received from the DB register 13.

The base station information DB 15 stores, for example, positional information, a tilt angle, and the sector orientation (sector direction) of each base station 4 that is provided, on the basis of station installation setting data retained by the communication carrier. When a radio-wave amplifier 203 such as a repeater is determined to be newly installed, the base station information DB 15 is updated using data received from the communication path determiner 24 (described later).

In response to receiving a request for searching for a radio-wave amplifier from a communication path determiner 24 of the analyzer 20, the radio-wave amplifier searcher 16 transmits a request for searching for any radio wave amplifier within a sector, to the LTE radio wave amplifier searcher 32 or the 3G radio wave amplifier searcher 42 (described later) and replies to the communication path determiner 24 with the search result.

The analyzer 20 conducts analysis using data collected by the collector 10.

The analyzer 20 includes a path searcher 21, the indoor/outdoor determiner 22, a radio communication quality estimator 23, the communication path determiner 24, a to-be-improved area DB 25, and a to-be-improved area determiner 26.

The path searcher 21 is a functional element including a general map system installed therein. Specifically, the path searcher 21 searches for the communication path for a mobile station 5 and the situations of buildings, if any, on the path, using to the information received from the DB register 13.

The indoor/outdoor determiner 22 obtains the radio-wave capturing status of a wireless LAN such as WiFi from the mobile station information stored in the measured value DB 14 and determines whether the mobile station is located indoor or outdoor. The indoor/outdoor determiner 22 notifies the wireless communication quality estimator 23 of the result of the determination as to whether the mobile station is located indoor or outdoor.

The radio communication quality estimator 23 estimates the communication quality of the mobile station 5 using the positional information of the mobile station 5, the information having been received from the path searcher 21 and the indoor/outdoor determiner 22.

Specifically, the radio communication quality estimator 23 estimates a propagation loss value (estimated Pathloss value) based on the communication path received from the path searcher 21 and the information from the indoor/outdoor determiner 22, particularly using the information from the indoor/outdoor determiner 22 based on the Okumura-Hata propagation-loss estimation expression to improve the accuracy of the estimation.)

The communication path determiner 24 calculates the propagation loss value (measured real Pathloss value) using the real reception strength of the mobile station 5 obtained from the measured value DB 14 and the transmission power of the base station obtained from the base station information DB 15. Then, the communication path determiner 24 compares the estimated propagation loss value (estimated Pathloss value) estimated by the radio communication quality estimator 23 with the calculated value to determine whether the communication path estimated by the radio communication quality estimator 23 is correct and also determine whether a radio-wave amplifier 203, such as a repeater is provided on the communication path. After determining the communication path, the communication path determiner 24 further identifies a path having low communication quality and registers the identified path in the to-be-improved area DB 25. When confirming installation of a radio-wave amplifier 203 such as a repeater, the communication path determiner 24 notifies the base station information DB 15 of the installation and causes the base station information DB 15 to register the confirm the radio-wave amplifier 203 in the base station information DB 15.

The to-be-improved area DB 25 stores therein areas having low communication quality notified from the communication path determiner 24 for each mobile station 5. The to-be-improved area DB 25 is updated each time receiving information from the communication path determiner 24 and holds the data in the form of statistic information.

The to-be-improved area determiner 26 identifies an area having low communication quality and a communication path having low communication quality by referring to the statistic information stored in the to-be-improved area DB 25 that stores therein information obtained from the mobile stations 5.

The LTE system 30 includes an LTE data transmitter/receiver 31 and an LTE radio wave amplifier searcher 32.

The LTE data transmitter/receiver 31 transmits mobile station information (e.g., positional information, radio quality information, base station information, radio-wave capturing status of a wireless LAN) to the LTE data transmitter/receiver 11. In addition, in response to receiving a request for obtaining radio-wave capturing status of wireless LAN such as WiFi from the LTE data transmitter/receiver 11, the LTE data transmitter/receiver 31 transmits a request for obtaining radio-wave capturing status to the mobile station 5 and replies to the LTE data transmitter/receiver 11 with the radio-wave capturing status received from the mobile station 5.

In response to receiving a request for searching for a radio-wave amplifier from the radio-wave amplifier searcher 16 of the management apparatus 2, the LTE radio wave amplifier searcher 32 searches for any radio-wave amplifier 203 within the local sector, and notifies the radio-wave amplifier searcher 16 of the search result.

The LTE data transmitter/receiver 31 and the LTE radio wave amplifier searcher 32 can be achieved by existing functions of an LTE system, and may be provided in any device included in nodes of the LTE system 30 or separately in multiple devices included in the nodes.

The 3G system 40 includes the 3G data transmitter/receiver 41 and the 3G radio wave amplifier searcher 42.

The 3G data transmitter/receiver 41 transmits mobile station information (e.g., positional information, radio quality information, base station information, radio-wave capturing status of a wireless LAN) to the 3G data transmitter/receiver 12 of the management apparatus 2. In response to receiving the request for obtaining radio-wave capturing status from the LTE data transmitter/receiver 11, the 3G data transmitter/receiver 41 transmits a request for obtaining radio-wave capturing status to the mobile station 5 and replies to the LTE data transmitter/receiver 11 with the radio-wave capturing status received from the mobile station 5.

In response to receiving a request for searching for a radio-wave amplifier from the radio-wave amplifier searcher 16, the 3G radio wave amplifier searcher 42 searches for any radio-wave amplifier 203 within the local sector, and notifies the radio-wave amplifier searcher 16 of the search result.

The 3G data transmitter/receiver 41 and the 3G radio wave amplifier searcher 42 can be achieved by existing functions of a 3G system, and may be provided in any device included in nodes of the 3G system 40 or separately in multiple devices included in the nodes.

(1-2) Functions and Operations

Next, description will now be made in relation to the function and the operation of the management apparatus 2 with reference to the accompanying drawings.

The management apparatus 2 identifies an area and a path to be a candidates for improving the communication quality thereof through the following four procedures, which are however roughly categorized.

1. Obtaining communication quality information representing measured communication quality information from a mobile station 5, and storing the obtained information into a database;
2. Estimating communication quality based on positional information obtained from the mobile station 5;
3. Determining a communication path; and
4. Determining an area radio quality of which is to be improved.

Hereinafter, these four procedures will now be each detailed.

(1-2-1) Obtaining Communication Quality Information Representing Measured Communication Quality Information from Mobile Station 5, and Storing Obtained Information into Database This procedure records mobile station information (positional information, measured communication quality information) represented by radio quality information (e.g., a communication frequency, a Pathloss value); base station information (e.g., a transmission power, a tilt angle, a sector angle); and radio-wave capturing status of wireless LAN such as WiFi to thereby configure a database to be used by the analyzer 20.

Description will now be made in relation to an operation of the collector 10 when collecting the signal quality information in the form of the measured communication quality information from a mobile station 5 and storing the collected data into a database, a data format of data to be transmitted and received, and a procedure sequence according to an example of the first embodiment with reference to FIGS. 3-9.

Figure 3:
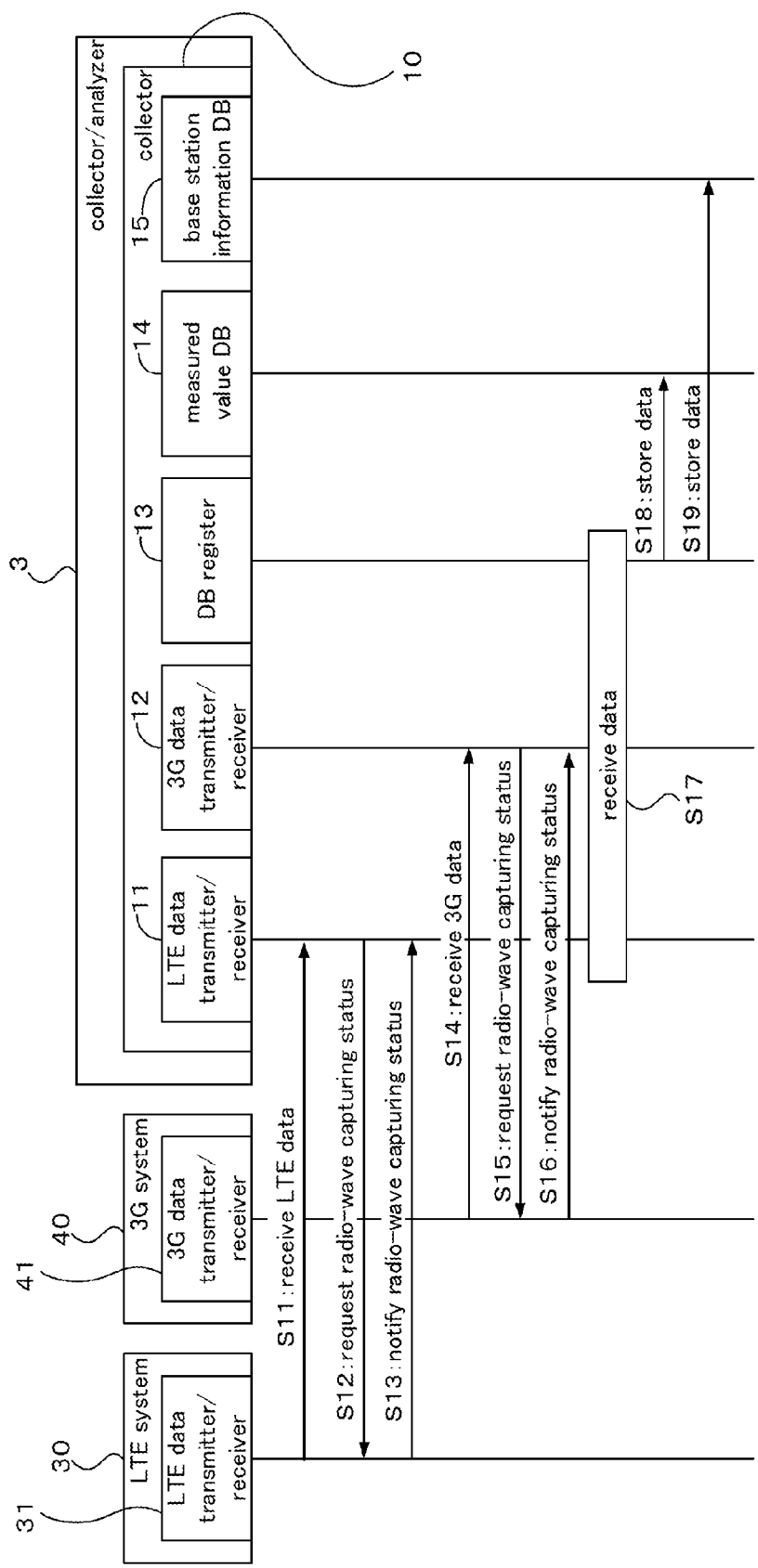
FIG. 3 is a diagram denoting a procedural sequence performed by a collector that obtains communication quality information representing measured communication quality information from a mobile terminal and storing the obtained information into a database in an example of the first embodiment.

FIG. 3 is a diagram denoting a procedural sequence of the collector 10 when obtaining communication quality information serving as the measured communication quality information from a mobile terminal 3 (sic, correctly 5) and storing the obtained information into a database in an example of the first embodiment.

In step S11 of FIG. 3, the LTE data transmitter/receiver 11 of collector 10 receives information (positional information, radio quality information, such as the communication frequency, and the reception strength), of a mobile station 5 being in LTE communication from the LTE data transmitter/receiver 31 of the LTE system 30.

Here, the mobile station information uses parameters described in, for example, 3GPP TS 36.355 (LTE Positioning Protocol (LPP)), TS 36.331 (Evolved Universal Terrestrial Radio Access (E-UTRA) Radio Resource Control (RRC) Protocol specification, which are the positional information standard in the 3GPP.

If the mobile station 5 is a 3G/LTE dual terminal, 3G radio quality information may be transmitted along with the LTE radio quality information.

FIG. 4 illustrates an example of the format of mobile station information 141 transmitted from the LTE system 30.

In FIG. 4, the field "user ID" represents identification information (ID) that determines the user; the field "date/time of measurement" represents the date and the time when the measured data is received; the filed "positional information" is represented by parameters of latitude, longitude, height/depth, and altitude and is obtained through, for example, a GPS200. The field "LTE cell information #n" (where n is a natural number of one or more) is information related to an LTE cell and appears n times one for each of the LTE cells. This field has subfields of "cell information" representing ID that determines the cell and "radio quality" representing a degree of interference and reception strength, which are correspond to "measured communication quality information." Likewise, the field "3G cell information #n" (where n is a natural number of one or more) is information related to a 3G cell and appears n times one for each of the 3G cells. This field has subfields of "cell information" representing ID that determines the cell and "radio quality" representing a degree of interference and reception strength, which are correspond to "measured communication quality information." The field "terminal type information" is an ID that determines the type of terminal. The example of the format denoted in FIG. 4 may be appropriately modified.

In step S12 of FIG. 3, the LTE data transmitter/receiver 11 of the collector 10 requests, in response to receiving such mobile station information, the LTE system 30 to notify radio-wave capturing status of additional radio wave that the mobile station 5 obtains.

In step S13, the LTE data transmitter/receiver 31 of the LTE system 30 notifies the LTE data transmitter/receiver 11 of the collector 10 of the radio-wave capturing status.

The requesting and notifying of radio-wave capturing status in steps S12 and S13 may be accomplished in any known manner, for example, by using an existing application.

Figure 5:
FIG. 5 is a diagram illustrating an example of the format of radio-wave capturing status of a mobile terminal sent from an LTE system of an example of the first embodiment.

FIG. 5 illustrates an example of the format of radio-wave capturing status 142 transmitted from the LTE system 30.

In FIG. 5, the field "user ID" is ID to determine the user; the field "captured radio-wave status" represents radio-wave capturing status (radio-wave status) of WiFi. It is appreciated that the example of the format of FIG. 5 may be appropriately modified.

In step S14 of FIG. 3, the 3G data transmitter/receiver 12 of the collector 10 receives information (positional information, radio quality information (e.g., communication frequency and reception strength) of the mobile station 5 being in 3G communication from the 3G data transmitter/receiver 41 of the 3G system 40.

Here, the user information uses parameter described in, for example, 3GPP TS 25.331 Radio Resource Control (RRC), and 3GPP TS 25.413 Radio Access Network Application Part (RANAP), which is the positional information standard in the 3GPP.

FIG. 6 is a diagram denoting an example of the format of user information 143 transmitted from the 3G system 40.

In FIG. 6, the field "user ID" represents ID that determines the user; the field "date/time of measurement" represents the date and the time when the measured data is received; the filed "positional information" is represented by parameters of latitude, longitude, height/depth, and altitude and is obtained through, for example, the GPS 200. The field "3G cell information #n" (where n is a natural number of one or more) is information related to a 3G cell and appears n times one for each of the 3G cells. This field has subfields of "cell information" representing ID that determines the cell and "radio quality" representing a degree of interference and reception strength, which are correspond to "measured communication quality information. The field "terminal type information" is an ID that determines the type of terminal. The example of the format denoted in FIG. 6 may be appropriately modified.

In step S15 of FIG. 3, the 3G data transmitter/receiver 12 of the collector 10 requests, in response to receiving such mobile station information, the 3G system 40 to notify radio-wave capturing status of radio wave that the mobile station 5 obtains.

In step S16, the 3G data transmitter/receiver 41 of the 3G system 40 notifies the radio-wave capturing status to the 3G data transmitter/receiver 12 of the collector 10.

The requesting and notifying of radio-wave capturing status in steps S15 and S16 may be accomplished in any known manner, for example, by using an existing application.

Figure 7:
FIG. 7 is a diagram illustrating an example of the format of radio-wave capturing status of a mobile terminal sent from a 3G system of an example of the first embodiment.

FIG. 7 illustrates an example of the format of radio-wave capturing status 144 transmitted from the 3G system 40.

In FIG. 7, the field "user ID" is ID to determine the user; the field "captured radio-wave status" represents radio-wave capturing status (radio-wave status) of WiFi. It is appreciated that the example of the format of FIG. 7 may be appropriately modified.

In steps S17-19 of FIG. 3, the DB register 13 of the collector 10 stores the mobile station information received in steps S11, S13, S14, and S16 into the measured value DB 14.

FIG. 8 illustrates an example of the data format of the measured value DB 14 after the mobile station information is registered therein, which is detailed below.

In FIG. 8, the field "user ID" represents ID that determines the user; the field "date/time of measurement" represents the date and the time when the measured data is received. The field "LTE cell information #n" (where n is a natural number of one or more) is information related to an LTE cell and appears n times one for each of the LTE cells. Likewise, the field "3G cell information #n" (where n is a natural number of one or more) is information related to a 3G cell and appears n times one for each of the 3G cells. The field of "captured radio-wave status" represents radio-wave capturing status (radio-wave status) of WiFi. The example of the format denoted in FIG. 8 may be appropriately modified.

FIG. 9 illustrates an example of the data format of the base station information DB 15.

In FIG. 9, the field "base station name" represents the name of a base station; and the field "type" represents the type (e.g., macro base station, or repeater) of the base station. The field "latitude/longitude/altitude" for a macro base station represents north/south latitude, latitude, longitude, height/depth, altitude, transmission power, communication frequency, tilt angle, and sector orientation of the base station while the same field for a repeater represents north/south latitude, latitude, longitude, height/depth, altitude (BS), altitude (MS), transmission power, communication frequency, mount angle of BS antenna, mount angle of MS antenna, and sector orientation of the repeater. The example of the format denoted in FIG. 9 may be appropriately modified.

(1-2-2) Estimating Communication Quality Based on Positional Information

This procedure estimates a communication quality (hereinafter called a (estimated communication quality) estimated from information obtained by a mobile station 5, using a propagation loss estimating expression.

Hereinafter, description will now be made in relation to a procedure of calculating an estimated communication quality from the positional information obtained from a mobile station 5 with reference to FIGS. 10-15.

Figure 10:
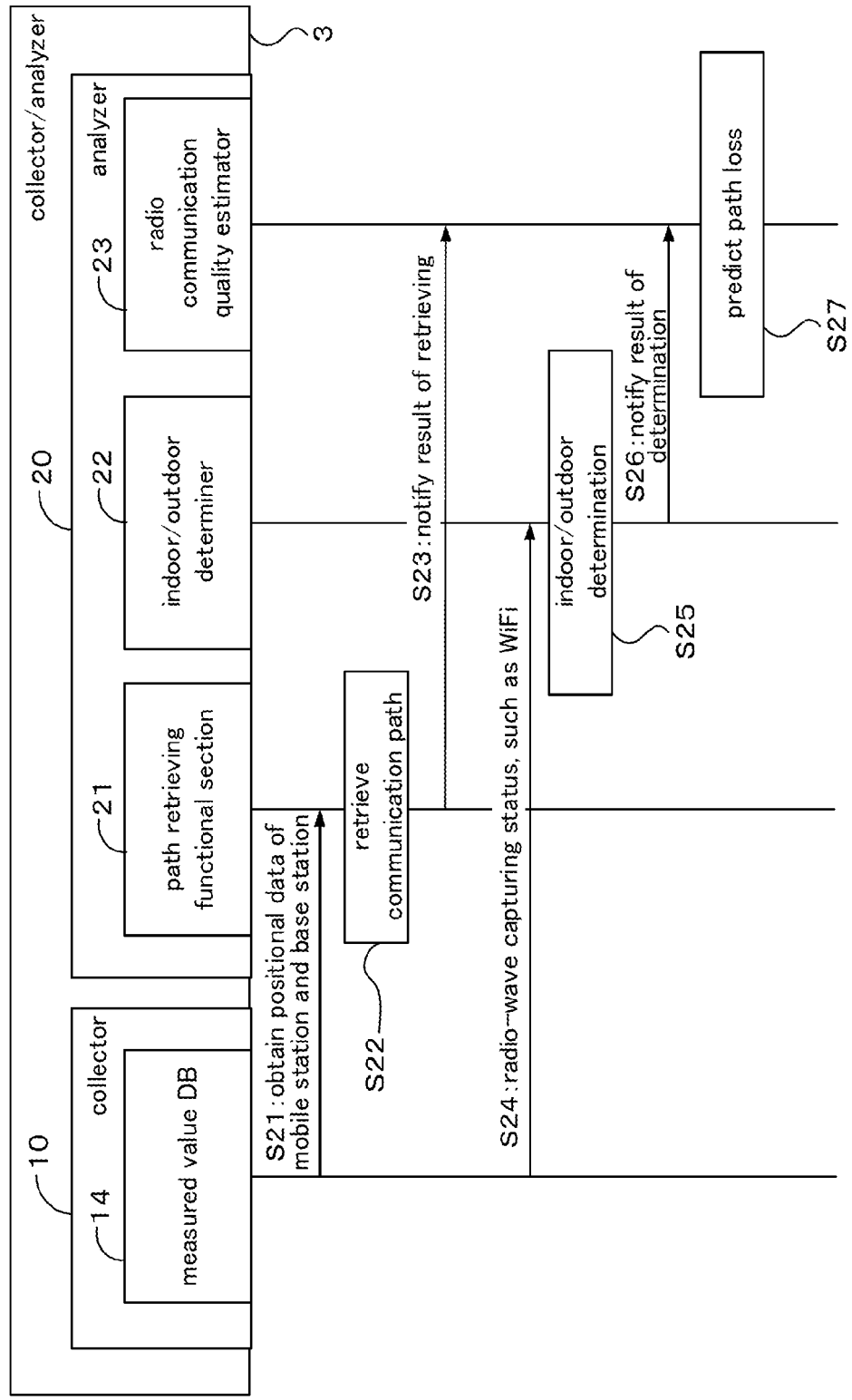
FIG. 10 is a diagram denoting a procedural sequence of estimating communication quality using positional information obtained from a mobile station in an example of the first embodiment.

FIG. 10 is a diagram denoting a procedural sequence of calculating estimated communication quality from the positional information obtained from a mobile station 5 in an example of the first embodiment.

In step S21 of FIG. 10, the path searcher 21 of the management apparatus 2 obtains the positional information of a mobile station 5 and a base station 4 from the measured value DB 14, and transmits the search result for a communication path to the radio communication quality estimator 23.

As described above, a general map system is installed in the path searcher 21, and a search function of a general map system is also installed in the path searcher 21. A satisfactory search function of a general map system outputs, during a search using positional data of two points, geographic data related to arrangement of facilities and roads in an area (e.g., a rectangular segment) including the two points. In step S22, the path searcher 21 searches for a communication path using positional information of the mobile station 5 and the base station 4. In step S23, the path searcher 21 transmits the identified communication path and the state of the presence of buildings on the path to the radio communication quality estimator 21 (sic, correctly the radio communication quality estimator 23) of the analyzer 20. An example of the communication path notified to the radio communication quality estimator 21 (sic, correctly radio communication quality estimator 23) in step S23 is a communication path obtained by approximating a straight line connecting the position of the mobile station 5 and the position of the base station 4. An example of the state of the presence of buildings notified to the radio communication quality estimator 21 (sic, correctly radio communication quality estimator 23) in step S23 is geographic data related to arrangement of facilities and roads in an area (e.g., a rectangular segment) including the two points representing the position of the mobile station 5 and the base station 4.

In step S23, the path searcher 21 notifies information representing whether the mobile station 5 is in an indoor area or an outdoor area obtained from the map system.

FIG. 11 illustrates an example of the format of response information 211 from the path searcher 21.

In FIG. 11, the parameter "base station name" represents a communication path; the parameter "relay n" (where n is a natural number of one or more) represents a relay such as a repeater, and if a relay is exist, a value is provided to this parameter; the parameter "rate of area occupied by building n" (where, n is a natural number of one or more) represents a rate of buildings present between the base station and a relay or between relays; the parameter "area accommodating mobile station" is an area accommodating the mobile station and take a value either one of "indoor" and "outdoor". The example of the format denoted in FIG. 11 may be appropriately modified.

In step S24 of FIG. 10, the indoor/outdoor determiner 22 of the analyzer 20 obtains radio-wave capturing status of a wireless LAN such as WiFi from the measured value DB 14 of the collector 10.

In step S25, the indoor/outdoor determiner 22 determines whether the mobile station 5 is located indoor or outdoor.

In step S26, the indoor/outdoor determiner 22 sends the radio communication quality estimator 23 the result of the determination of step S25.

The area accommodating the mobile station included in the response information transmitted from the path searcher 21 in step S23 is information calculated using the map system. In step S26, the area accommodating the mobile station estimated from the measured value is added to factors to be used for the estimation, so that the accuracy of the estimation can be further improved.

Here, by referring to FIG. 12, description will now be made in relation to the determination of the area accommodating the mobile station made by the indoor/outdoor determiner 22.

Figure 12:
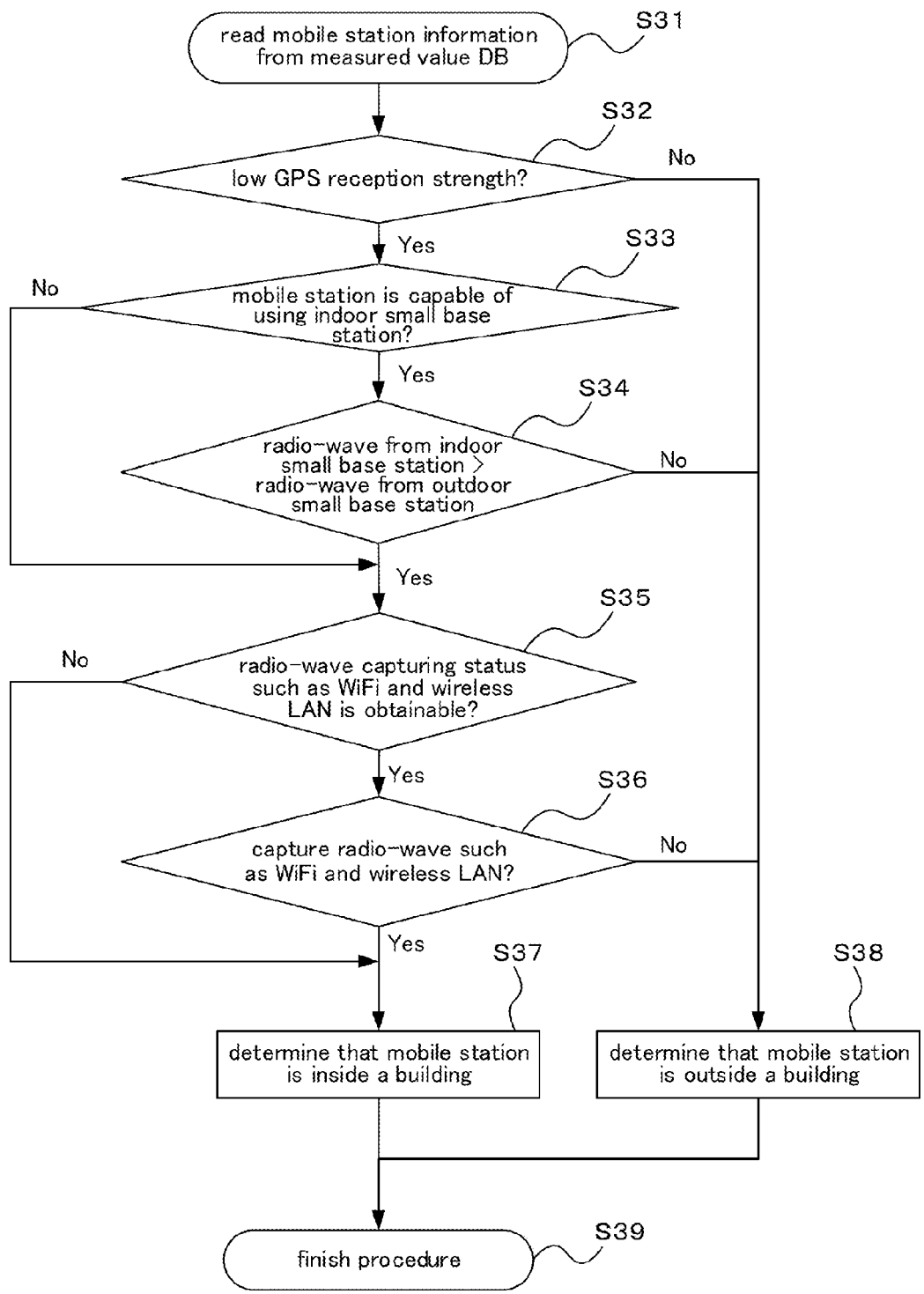
FIG. 12 is a flow diagram denoting determining an area accommodating a mobile station by an indoor/outdoor determiner in an example of the first embodiment.

FIG. 12 is a flow diagram illustrating determination of the area accommodating the mobile station in an example of the first embodiment.

In step S31, the indoor/outdoor determiner 22 reads the mobile station information of the mobile station 5 from the measured value DB 14.

In step S32, the indoor/outdoor determiner 22 determines whether the strength of radio wave received from the GPS 200 is low by, for example, comparing the strength of the received radio wave with a threshold.

If the strength of the radio wave received from the GPS 200 is high (see No route in step S32), the mobile station 5 has a high possibility of being in an outdoor area and therefore the procedure moves to step S38 to terminate the procedure with the result that the mobile station 5 is in an outdoor area.

In contrast, if the strength of the radio wave received from the GPS 200 is low (see Yes route in step S32), the mobile station 5 has a high possibility of being in an indoor area and therefor the procedure moves to step S33.

In step S33, the indoor/outdoor determiner 22 determines whether the mobile station 5 is capable of using an indoor small wireless base station 201.

If the mobile station 5 is capable of using the indoor small wireless base station 201 (see Yes route in step S33), the indoor/outdoor determiner 22 moves to determination of step S34.

In the mobile station 5 is incapable of using the indoor small wireless base station 201 (see No route in step S33), the indoor/outdoor determiner 22 moves to determination of step S35.

In step S34, the indoor/outdoor determiner 22 determines whether the strength of radio wave received from the indoor small wireless base station 201 is high. For example, the indoor/outdoor determiner 22 determines whether the strength of radio wave received from the indoor small wireless base station 201 is higher than that received from the outdoor base station 4.

If the strength of the radio wave received from the indoor small wireless base station 201 is lower (see No route in step S34), the mobile station 5 has a high possibility of being in an outdoor area and therefore the indoor/outdoor determiner 22 moves the procedure to step S38 to terminate the procedure with the result that the mobile station 5 is located indoor.

In contrast, if the strength of the radio wave received from the indoor small wireless base station 201 is higher (see Yes route in step S34), the mobile station 5 has a high possibility of being in an indoor area and therefor the procedure moves to determination in step S35.

In step S35, the indoor/outdoor determiner 22 determines whether the mobile station 5 is capable of receiving radio wave from an indoor service such as WiFi and/or wireless LAN.

If the mobile station 5 is capable of receiving radio wave from an indoor service (see Yes route in step S35), the indoor/outdoor determiner 22 moves to determination of step S36.

If the mobile station 5 is incapable of receiving radio wave from an indoor service (see No route in step S35), the indoor/outdoor determiner 22 move the procedure to step S37.

In step S36, the indoor/outdoor determiner 22 determines whether the mobile station 5 is receiving radio wave from an indoor service such as WiFi and/or wireless LAN. If the mobile station 5 is receiving radio wave from an indoor service, the mobile station 5 seems to have a high possibility of being in an indoor area.

However, the mobile station 5 being in outdoor may receive radio wave of a wireless LAN, such as WiFi. For exact determination, the determination on step S36 may have an additional condition such as "receiving radio wave of a wireless LAN such as WiFi for a predetermined time period", "receiving a particular frequency (e.g., 5 GHz; frequency for indoor service)", or "receiving radio wave having a strength larger than a threshold".

If the mobile station 5 is receiving radio wave from an indoor service (see Yes route in step S36), the indoor/outdoor determiner 22 determines, in step S37, that the mobile station 5 is located indoor.

If the mobile station 5 is not receiving radio wave from an indoor service (see No route in step S36), the indoor/outdoor determiner 22 determines, in step S37, that the mobile station 5 is located outdoor.

As described by referring to the above flow diagram, the indoor/outdoor determiner 22 determines the area accommodating the mobile station 5 using the return value from the path searcher 21 and the result of the indoor/outdoor determination, which is summarized in FIG. 13. FIG. 13 denotes determination on the area (indoor area or outdoor area) accommodating the mobile station 5, the determination being made by the indoor/outdoor determiner 22 on the basis of the combination of the return value from the path searcher and the result of the indoor/outdoor determination. As denoted in FIG. 13, if the return value from the path searcher is different from the result of the indoor/outdoor determination the indoor/outdoor determiner 22 overrides the result of the indoor/outdoor determination.

Next, in step S27 of FIG. 10, the radio communication quality estimator 23 estimates a propagation loss $L_{p\_EST}$ (estimated communication quality) of the mobile station 5 on the basis of the path information identified by the path searcher 21 in step S22 and the information received from the indoor/outdoor determiner 22 in step S26 using a propagation loss estimation expression.

Here, the estimated propagation loss $L_{p\_EST}$ is defined as follows. The following expression includes a correction value S related to the rate occupied by building for considering the effect of the geographic features and a building entry loss of the area accommodating the mobile station 5 determined in step S25 of FIG. 10 in the Okumura-Hata propagation-loss estimation model that statistically processes a propagation loss on the basis of an urban area having semi-flat terrain.

$$L_{p\_EST} = L_p + S + L_i \quad (1)$$

where, $L_p$: propagation loss calculated from Okumura-Hata model;

S: a correction value of the rate occupied by building $L_i$: building entry loss (when the mobile station is in an outdoor area, $L_i=0$)

The propagation loss of the mobile station 5 is estimated using the above estimating expression.

Here, the propagation loss $L_p$ calculated from the Okumura-Hata model is defined as follows.

$$L_p = 69.55 + 26.16 \log_{10} f_c - 13.82 \log_{10} h_b - a(h_m) + (44.9 - 6.55 \log_{10} h_b) \log_{10} r \, [dB] \quad (2)$$

where, $f_c$: frequency (150-2200 [MHz])

$h_b$: antenna height of base station (30-200 [m])

$h_m$: antenna height of mobile station (1-10 [m])

r: distance between base station and mobile station (1-20 [m])

$a(h_m)$: correction value (of antenna height of mobile station)

The expression (2) is defined as follows.

In small or middle cities, $$a(h_m) = (1.1 \log_{10} f_c - 0.7) h_m - (1.56 \log_{10} f_c - 0.8) \quad (3)$$

In larger cities, when the frequency $f_c < 400$ MHz, $$a(h_m) = (8.29 \log_{10} 1.54 h_m)^2 - 1.1 \quad (4)$$

In larger cities, when the frequency $f_c \geq 400$ MHz, $$a(h_m) = 3.2 (\log_{10} 11.75 h_m)^2 - 4.97 \quad (4)$$

Figure 14:
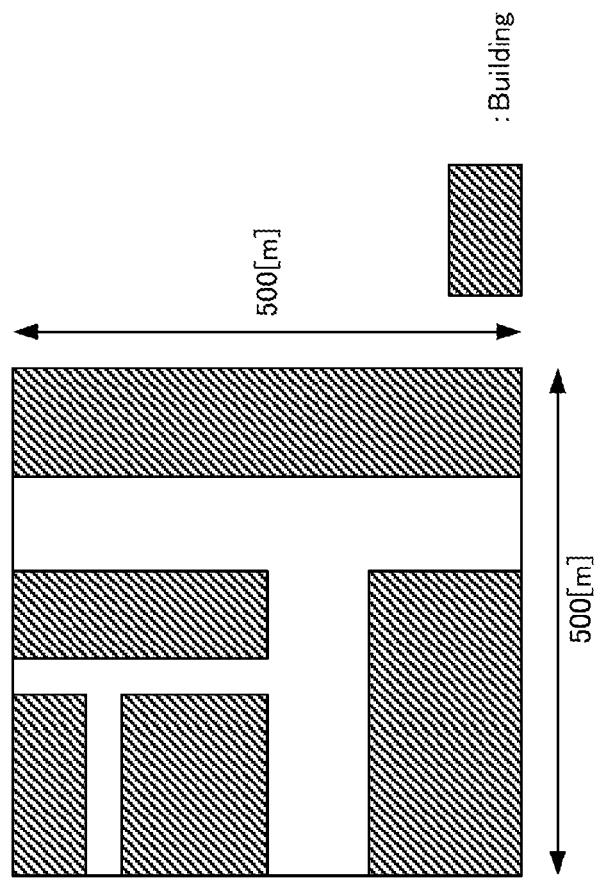
FIG. 14 is a diagram illustrating an example of a rate of area occupied by building in an example of the first embodiment.

A correction value (S) of the rate of area occupied by building in Expression (1) is based on a percentage (α) of area occupied by building in a segment having a size of roughly 500 m×500 m as depicted in FIG. 14.

In FIG. 14, the gray parts corresponds to areas occupied by building and a rate of area occupied by building in a segment of 500 m×500 m is calculated to be α(%) with the following direction.

$$\alpha = [(\text{total of projected areas of building})/(500 \times 500)] \times 100(\%) \quad \text{(Expression 1)}$$

On the basis of the rate (α%) of area occupied by building obtained by the above expression, the correction value S of the rate of area occupied by building considering the propagation loss is calculated by the following expression.

$$S = -19 \log_{10} \alpha + 26 \, (dB)$$

The building entry loss Li of Expression (1) depends on the scale and the structure of each building. A typical expression of estimating a building entry loss is described as follows.

$$L_i[dB] = 10 + d \, (d \leq 15) \quad (5)$$

In Expression 5, the term "d" represents the distance (m) between a window and an indoor reception point.

If the mobile station 5 is determined to be in an outdoor area in step S27 of FIG. 10, the building entry loss $L_i$ is assumed to be zero.

Alternatively, Expression (5) may be replaced with a fixed loss value of each material being commonly used. Examples of building entry loss are denoted in FIG. 15.

FIG. 15 lists various construction materials with the thicknesses thereof and building entry loss values of the respective radio frequencies (MHz). As denoted in FIG. 15, thermal barrier film and heat-insulation fiberglass provide very high building entry losses.

(1-2-3) Determining Communication Path

This procedure determines the communication path of the mobile station 5 from the measured communication quality value in the above procedure and the estimated communication quality value of the above procedure.

The procedure of determining a communication route will now be described with reference to FIGS. 16-18.

Figure 16:
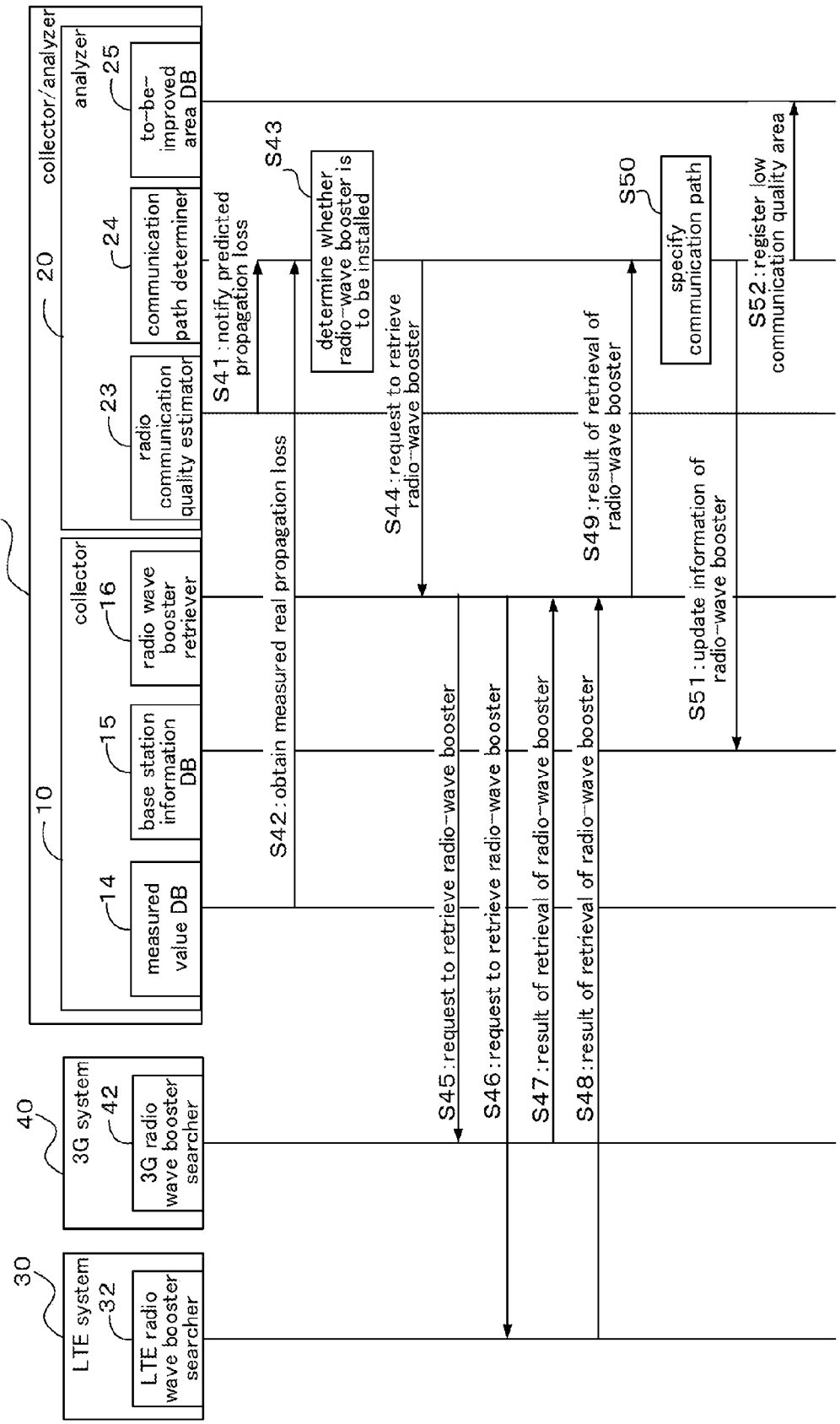
FIG. 16 is a diagram illustrating a procedural sequence of determining a communication path of an example of the first embodiment.

FIG. 16 is a diagram denoting a procedural sequence of determining a communication path in an example of the first embodiment.

The radio communication quality estimator 23 notifies the communication path determiner 24 of the estimated radio-wave communication quality (estimated propagation loss $L_{p\_EST}$) (step S41).

The communication path determiner 24 obtains the measured real value of the communication quality from the measured value DB 14 (step S42).

In step S43, the communication path determiner 24 determines whether the mobile station 5 is within the service area of the radio-wave amplifier 203 such as a repeater from the estimated radio communication quality $L_{p\_EST}$ estimated by the radio communication quality estimator 23 and the measured real value in the measured value DB 14.

As one example, the communication path determiner 24 obtains the measured real propagation Loss $L_{p\_REA}$ by expression $L_{p\_REA}$=(base-station transmission power; measured real value)–(mobile station reception strength; measured real value), and compares the estimated propagation loss (estimated Pathloss value) $L_{p\_EsT}$ with the measured real propagation loss $L_{p\_REA}$. When $L_{p\_EST} \leq L_{p\_REAL}$ is satisfied, the communication path determiner 24 determines that the mobile station 5 is in the service area of the radio-wave amplifier 203. When $L_{p\_EsT} > L_{p\_REAL}$ is satisfied, the communication path determiner 24 determines that the mobile station 5 is outside the service area of the radio-wave amplifier 203.

If the mobile station 5 is determined to be in the service area of the radio-wave amplifier 203, the communication path determiner 24 issues a request for searching for a radio-wave amplifier to the radio-wave amplifier searcher 16 in step S44.

In response to receiving the request for searching for a radio-wave amplifier, the radio-wave amplifier searcher 16 issues a request for searching for a radio-wave amplifier to the LTE radio wave amplifier searcher 32 or the 3G radio wave amplifier searcher 42 (step S45 or step S46).

In response to receiving the request for searching for a radio-wave amplifier, the LTE radio wave amplifier searcher 32 or the 3G radio wave amplifier searcher 42 searches for any local radio-wave amplifier 203 (within the local sector).

Here, exemplary techniques for searching for a radio-wave amplifier 203 include determining whether the radio wave from the base station A is amplified, and searching for a radio-wave amplifier 203 in the cover area (sector) of the base station 4, from the base station information DB 15.

Then, the LTE radio wave amplifier searcher 32 or the 3G radio wave amplifier searcher 42 notifies the radio-wave amplifier searcher 16 of the radio-wave amplifier information (e.g., positional information, tilt angle, and sector orientation) (step S47 or step S48). FIG. 17 denotes an example of the format of the search result 161 of a radio-wave amplifier notified in this step.

Figure 17:
FIG. 17 is a diagram illustrating an example of the format of a result of a search for a radio-wave amplifier in an example of the first embodiment.

In FIG. 17, the field "device name" represents the name of a radio-wave amplifier; the field "latitude/longitude/altitude" represents north/south latitude, latitude, longitude, height/depth, altitude (BS), altitude (MS), transmission power, communication frequency, mount angle of BS antenna, mount angle of MS antenna, and sector orientation. The example of the format denoted in FIG. 17 may be appropriately modified.

In step S49, the radio-wave amplifier searcher 16 notifies the communication path determiner 24 of the search result for a radio-wave amplifier having been notified in step S47 or step S48.

In step S50, the communication path determiner 24 determines the real communication path based on the received radio-wave amplifier information (e.g., positional information, tilt angle, and sector orientation).

Here, when the mobile station 5 is within the service area of a radio-wave amplifier 203 such as a repeater, the communication path determiner 24 registers the radio-wave amplifier 203 into the base station information DB 15 (step S51).

For example, when a low communication quality area having communication quality lower than a predetermined threshold exists, the communication path determiner 24 registers the low-quality area as a candidate for an area to be improved in the to-be-improved area DB 25. The to-be-improved area DB 25 accumulates therein information of candidates for an area to be improved collected from multiple users.

FIG. 18 illustrates an example of the data format of the to-be-improved area DB 25.

In FIG. 18, the field "starting point" represents the name of a device at the starting point of the path; the field "relay n" (where, n is a natural number of one or more) represents the name of a relay on the path if any; the field "end point" is the name of a device at the end point of the path; and the field "attenuation rate" represents an attenuation rate of the path. For example, the first path in FIG. 18 does not pass through a relay between the base station A and the mobile station A and has an attenuation rate of 10 dB. The example of the format denoted in FIG. 19 may be appropriately modified.

(1-2-4) Determining Area to Improve Radio Quality

This procedure identifies an area radio quality of which is low and therefore is to be improved.

Description will now be made in relation to a procedure to determine an area radio quality of which is to be improved by referring to FIGS. 19-22.

Figure 19:
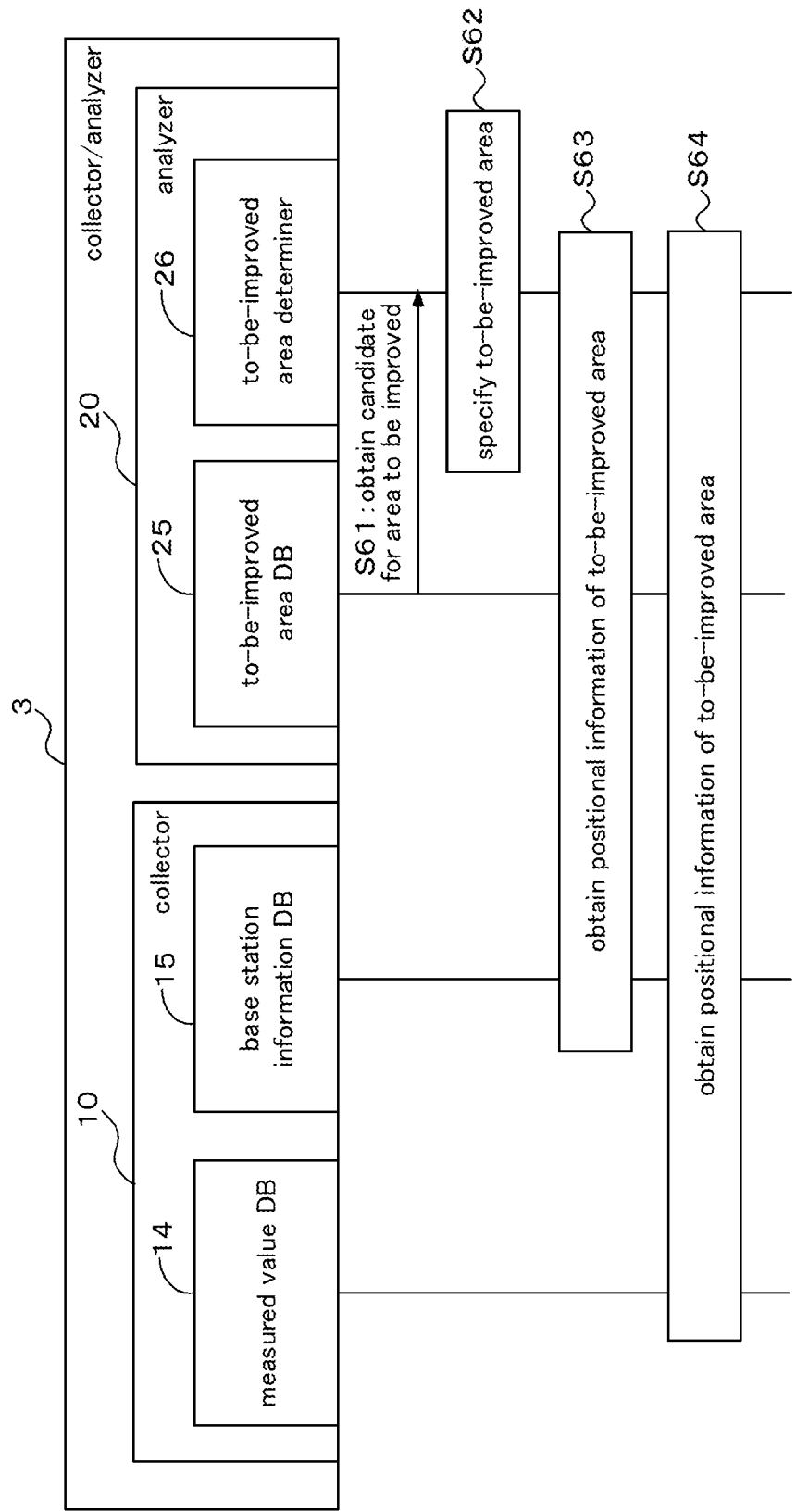
FIG. 19 is a diagram denoting a procedural sequence of determining an area radio quality of which is to be improved in an example of the first embodiment.

In step S61 of FIG. 19, the to-be-improved area determiner 26 obtains information of candidates for area to be improved accumulated in the to-be-improved area DB 25.

At this time point, the to-be-improved area DB 25 registers therein information of candidates for an area to be improved which information is registered as a result of analyzing the radio communication quality of multiple mobile stations 5.

The to-be-improved area determiner 26 identifies any area(s) that many mobile stations 5 have reported to have low communication quality, obtains positional information from the base station information obtained by the measured value DB 14 and the base station information DB 15, and identifies an area to be improved (step S62).

At that time, the to-be-improved area determiner 26 records an amplification rate of each relay obtained from the base station information DB 15 into paths registered in the to-be-improved area DB 25 (see (1) in hatched field in FIG. 20). In the example of FIG. 20, numbers "10" and "7" are recorded in the field of the amplification rate of relays A and B, respectively.

When no relay is present between the base station 4 and the mobile station 5, the attenuation rate of the corresponding path is recorded to be the attenuation rate at the end point (i.e., the mobile station 5) into the base station information DB 15 (see (2) in hatched field in FIG. 20). For example, the path on the first line of FIG. 20, which does not pass through a relay, the attenuation rate 10 of the path is recorded in the attenuation rate of the mobile station A at the end point. Likewise, the values 3 and 7 are recorded into the attenuation rates of the mobile stations D and E, respectively.

FIG. 20 illustrates the to-be-improved area DB 25 when the above processes (1) and (2) are completed.

Next, the to-be-improved area determiner 26 searches for mobile stations 5 present in the vicinity of relays from the measured value DB 14 and the base station information DB 15.

In the illustrated example, the mobile station 5 in the vicinity of the relay A and the mobile station 5 in the vicinity of the relay B are respectively referred to as "mobile station E" and "mobile station F".

The to-be-improved area determiner 26 records the attenuation rate of the mobile station E to be the attenuation rate of the relay A (see (3) in hatched field in FIG. 21).

Next, the to-be-improved area determiner 26 calculates the attenuation rate of a mobile terminal 5 of each path on which only the relay A is provided between the base station 4 and the mobile station 5, using the following expression, and records the calculated attenuation rate into the to-be-improved area DB 25 (see (4) in hatched field in FIG. 21).

(attenuation rate of mobile station)=(attenuation rate of entire path)−(attenuation rate of relay 1)+(amplification rate of relay 1)

For example, the attenuation rate of the mobile station B is calculated to be 3−7+10=6; and that of the mobile station F is calculated to be 1−7+10=4. These calculated attenuation rates are recorded into the corresponding fields of the to-be-improved area DB 25.

Next, the to-be-improved area determiner 26 records the attenuation rate of the mobile station F to be that of the relay B in the to-be-improved area DB 25 (see (5) in hatched field in FIG. 22).

In the same manner, the to-be-improved area determiner 26 calculates the attenuation rate of a mobile terminal 5 of each path on which only the relay B is provided between the relay A and the mobile station 5, using the following expression, and records the calculated attenuation rate into the to-be-improved area DB 25 (see (6) in hatched field in FIG. 22).

(attenuation rate of mobile station)=(attenuation rate of the entire path)−{(attenuation rate of relay 1)−(amplification rate of relay 1)}−{(attenuation rate of relay 2)−(amplification rate of relay 2)}

For example, the attenuation rate of the mobile station C is calculated to be 1−(7−10)−(4−7)=7, and the value "7" is recorded in the hatched field (6) in the to-be-improved area DB 25.

This process is repeated a number of times as many as the relays.

By referring to the table of FIG. 22, the above example identifies that:

area to be improved (path to be improved): between the base station A and the relay A; and area to be improved: areas accommodating the mobile stations A and E.

The above example assumes an area having an attenuation rate of 5 dB or more to be an area to be improved. Alternatively, any threshold can be used in line with practical schemes.

After areas and/or paths to be improved are determined, the radio communication quality of the areas and/or paths can be improved by, for example, arranging additional repeaters.

Figure 23:
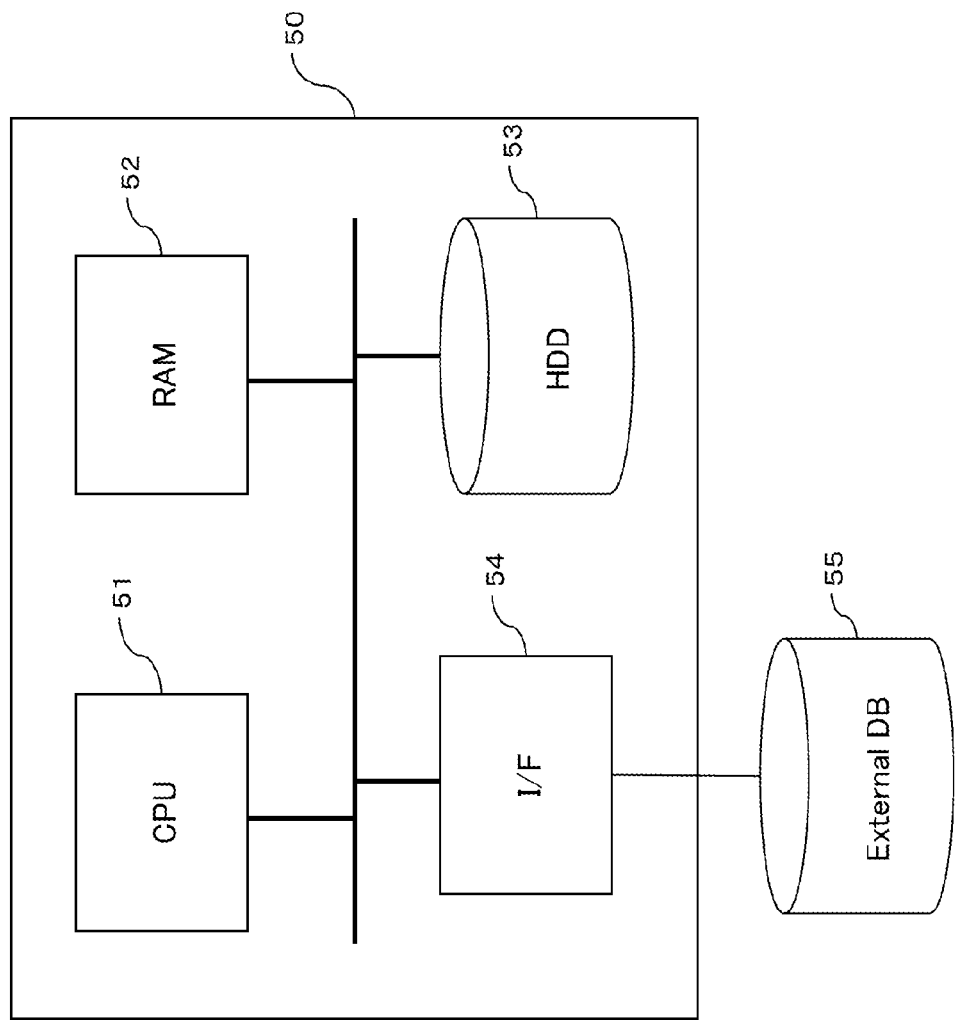
FIG. 23 is a diagram illustrating the hardware configuration of an example of the first embodiment.

FIG. 23 illustrates an example of the hardware configuration of the management apparatus 2 according to an examples of the first embodiment.

An example of the management apparatus 2 is incorporated in one of a radio network controller RNC 6 of the 3G system 40, a superordinate device of the RNC 6, an outdoor LTE wireless base station eNodeB 4-1 of the LTE system 30, and a superordinate device of the eNB 4-1. An example of these devices is achieved by an information processing apparatus 50 having the hardware configuration of FIG. 23, which includes a Central Processing Unit (CPU) 51, a Random Access Memory (RAM) 52, a Hard Disk Drive (HDD) 53, and an external interface (I/F) 54. An example of the I/F 54 is a network interface card (NIC), through which the information processing apparatus 50 may be connected to an external database 55.

Figure 24:
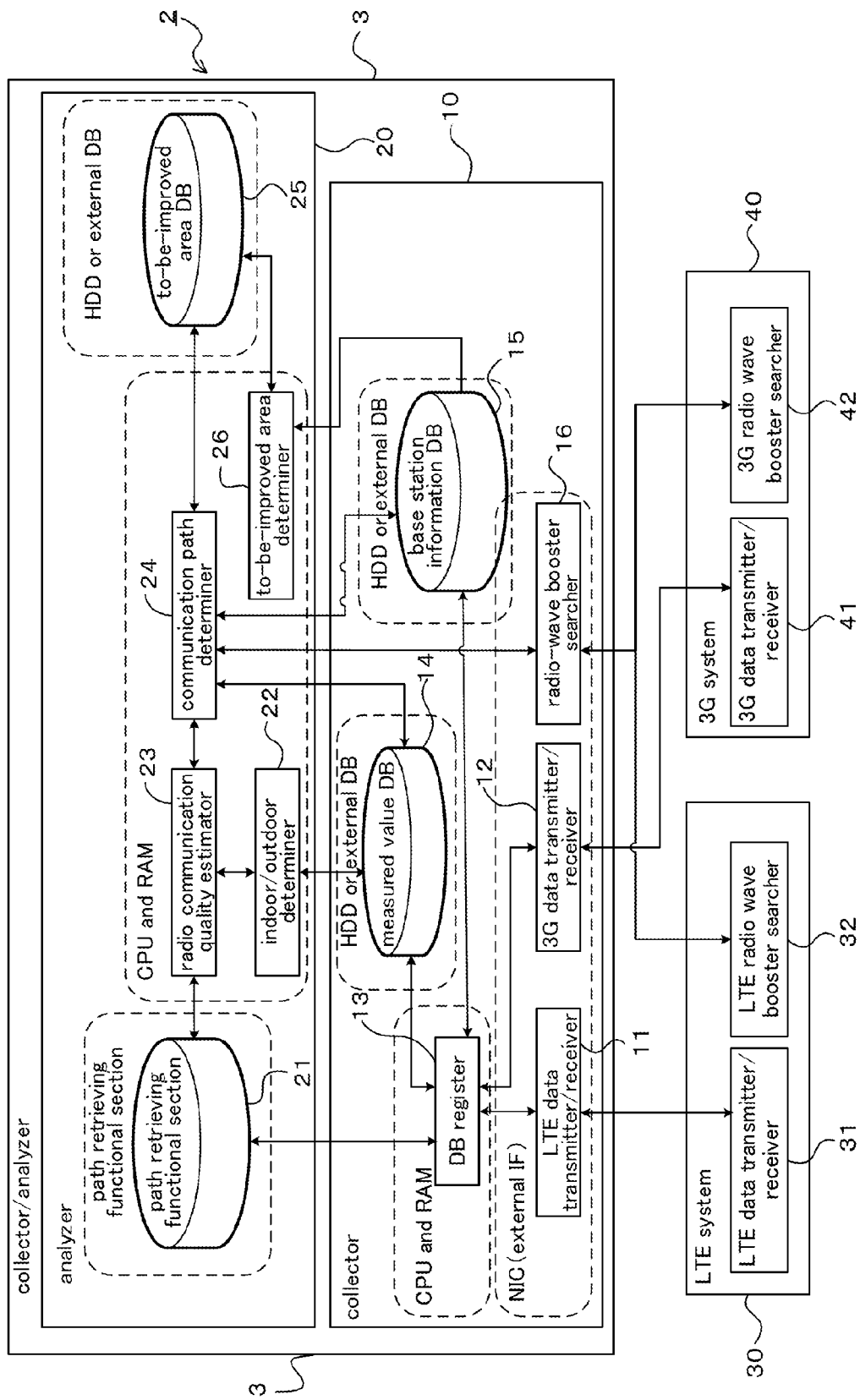
FIG. 24 is a diagram illustrating association of the respective functional blocks of FIG. 2 with hardware elements in an example of the first embodiment.

FIG. 24 illustrates association of the respective functional blocks of FIG. 2 with hardware elements of FIG. 23.

As illustrated in FIG. 24, the CPU 51 of the information processing apparatus 50 executing a program for identifying a candidate for improving communication quality functions as the DB register 13, the indoor/outdoor determiner 22, the radio communication quality estimator 23, the communication path determiner 24, and the to-be-improved area determiner 26.

The program for identifying a candidate for improving communication quality causes the wireless communication system 1 that includes base stations 4 and mobile stations 5 to carry out information processing for determining candidates for improving communication quality. Specifically, the program instructs a computer to execute steps of: obtaining measured communication quality information and positional information from a mobile station 5; estimating communication quality from the positional information obtained from the mobile station 5; determining a communication path from the estimated communication quality and the measured communication quality information; and determining a candidate for improving the communication quality related to the determined communication path on the basis of the communication quality.

The program (for identifying a candidate for improving communication quality) that achieves the functions of the DB register 13, the indoor/outdoor determiner 22, the radio communication quality estimator 23, the communication path determiner 24, and the to-be-improved area determiner 26 is provided in the form of being recorded in a tangible and non-transient computer-readable storage medium, such as a flexible disk, a CD (e.g., CD-ROM, CD-R, and CD-RW), a DVD (DVD-ROM, DVD-RAM, DVD-R, DVD+R, DVD-RW, and DVD+RW), a magnetic disk, an optical disk, and an magneto-optical disk. A computer reads the program from the storage medium and stores the read program in an internal or external storage device for future use. Alternatively, the program may be recorded in a recording device (storage medium), such as a magnetic disk, an optical disk, or a magneto-optical disk, and may be provided from the recording device to the computer via a communication path.

Further alternatively, in achieving the functions of the DB register 13, the radio communication quality estimator 23, the communication path determiner 24, and the to-be-improved area determiner 26, the program stored in a non-illustrated internal storage device (corresponding to the RAM 52 or the ROM of the information processing apparatus 50 in the first embodiment) is executed by the microprocessor (corresponding to the CPU 51 in the first embodiment) of the computer. At that time, the computer may read the program stored in the storage medium and may execute the program.

In the first embodiment, a computer is a concept of a combination of hardware and an operating system (OS), and means hardware which operates under control of the OS. Otherwise, if a program does not need an OS but does operate hardware independently of an OS, the hardware itself corresponds to the computer. Hardware includes at least a microprocessor such as a CPU and means to read a computer program recorded in a storage medium. In the first embodiment, the information processing apparatus 50 has a function of a computer.

The HDD 51 or the external database 55 of the information processing apparatus 50 functions as the measured value DB 14, the base station information DB 15, the path searcher 21, and the to-be-improved area DB 25.

The I/F 54 of the information processing apparatus 50 functions as the LTE data transmitter/receiver 11, the 3G data transmitter/receiver 12, and the radio-wave amplifier searcher 16.

Alternatively to the above association of the respective functional blocks with hardware elements, the functional blocks may be achieved by different hardware elements.

Some of the above functional blocks may be dispersed in multiple units.

Figure 25:
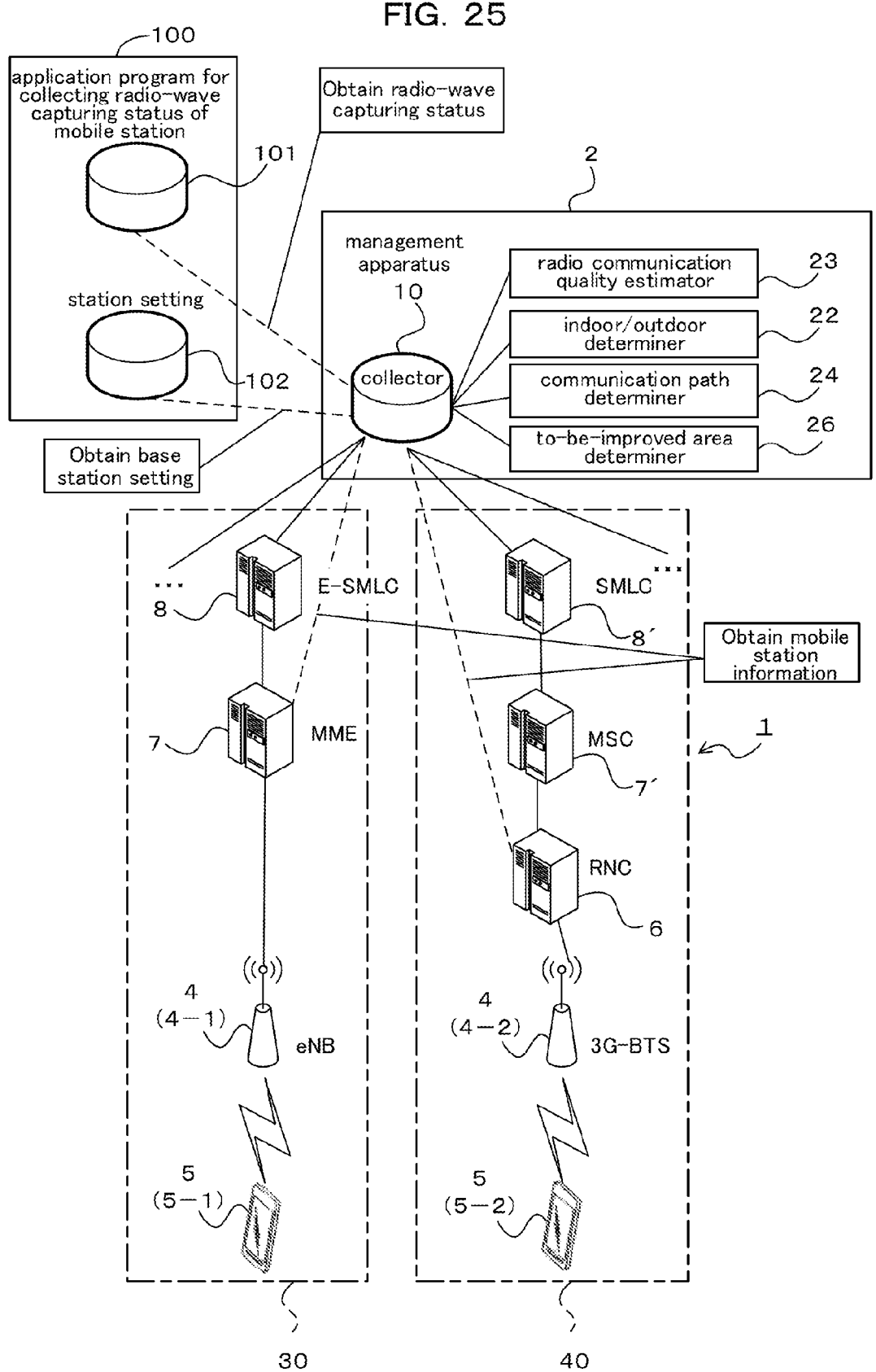
FIG. 25 is a diagram illustrating association of the system configuration of FIG. 1 with various pieces of information to be obtained in an example of the first embodiment.

FIG. 25 is a diagram illustrating an association of the system configuration of FIG. 1 with various pieces of information to be obtained.

The mobile station information as exemplified in FIGS. 4 and 6 is obtained from the RNC 6 in the 3G system 40 and from the eNB 4-1 in the LTE system 30.

The radio-wave capturing status as exemplified in FIGS. 5 and 7 is obtained from, for example, an application server 100 such as a radio-wave capturing status collecting application 100.

The base station information as exemplified in FIG. 9 is obtained from, for example, station setting 102 that the communication carrier holds.

The wireless communication system 1 and/or the management apparatus 2 of an example of the first embodiment bring the following advantages.

Calculating the communication path and the communication quality from the positional information of mobile station 5 and the base station 4 and the radio quality that are obtained from the mobile station 5 makes it possible to easily determine a candidate area for improving the radio quality because of low radio quality with high accuracy, eliminating the need for measurement at the site by the operator. Furthermore, a path having a low communication quality can be determined among the candidate area for improving the radio quality.

Alternatively, the communication path can be determined only from an obtainable propagation loss value included in the Measurement Report that the mobile station 5 transmits when the location of the mobile station 5 is being registered and the area quality of which is to be improved can be determined from the radio quality of the communication path.

Comparing the Passloss value estimated from the positional information of the mobile station 5 and the measured real pathloss value makes it possible to determine whether a radio-wave amplifier 203 such as a repeater is interposed on the path. If there is a possibility that a radio-wave amplifier 203 is interposed, the base station 4 is instructed to search for a radio-wave amplifier in the sector under the control of the base station 4 to detect a radio-wave amplifier 203 that has not been registered yet, which is then registered into the base station.

The indoor/outdoor determination is made on the basis of the feature of an indoor mobile station 5 (for example, the status of capturing radio wave of indoor service, the radio wave strength of the GPS) in addition to the map data, which improves the accuracy of the indoor/outdoor determination and further improves the accuracy of an estimated Pathloss value.

Furthermore, the expression to calculate the loss additionally uses a correction value of the rate occupied by the building and a building entry loss, which can further improve the accuracy of the estimation of the loss.

(2) Second Embodiment (2-1) Configurations

Figure 26:
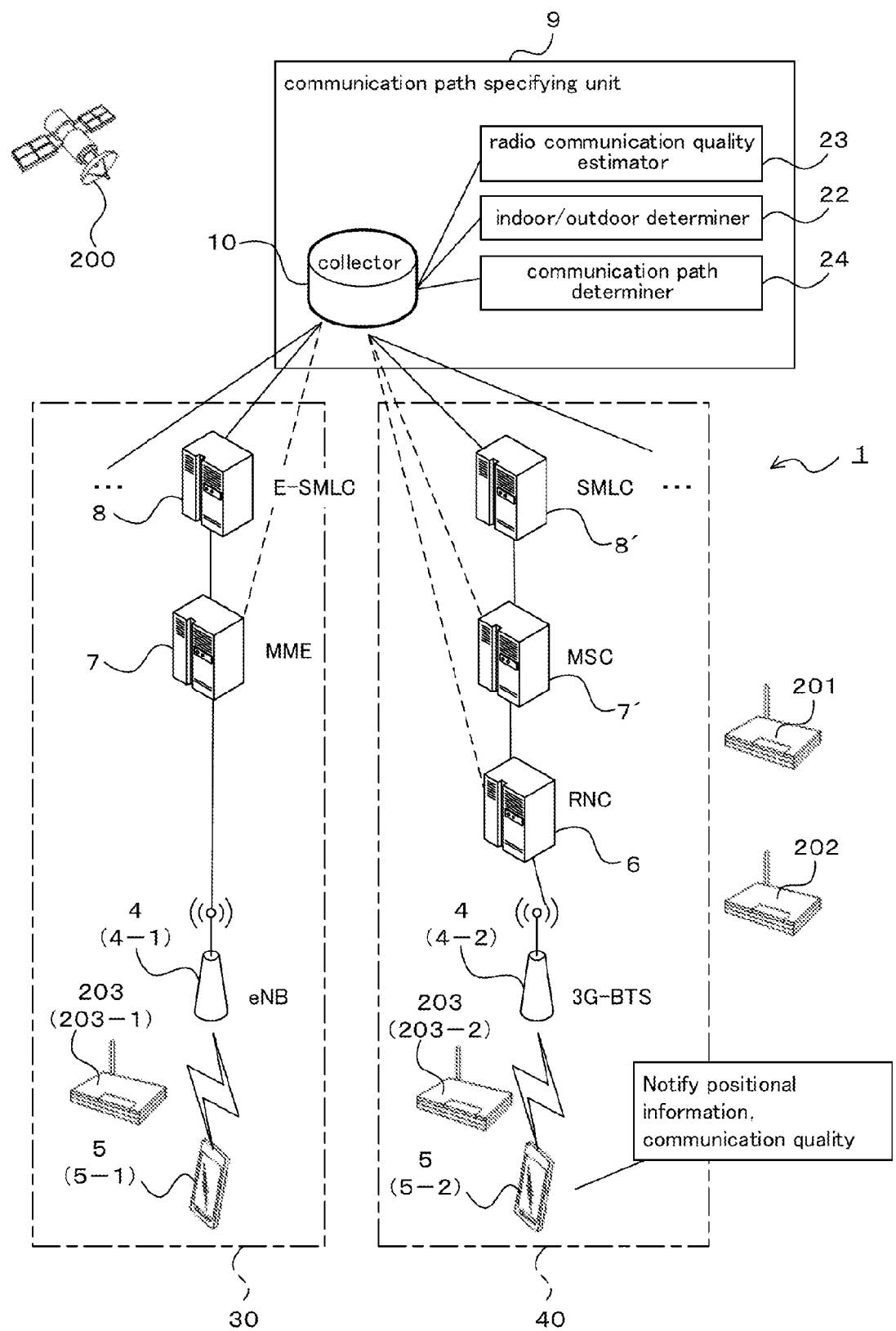
FIG. 26 is a diagram schematically illustrating the system configurations of a wireless communication system and a communication path determining unit according to an example of a second embodiment.

FIG. 26 is a diagram schematically illustrating the system configurations of a wireless communication system 1 and a communication path determining unit 9 according to an example of a second embodiment.

The communication path determining unit 9 of the second embodiment is included in the wireless communication system 1, which includes a LTE system 30 and a 3G system 40.

The communication path determining unit 9 determines a radio communication path between a base station and a mobile station in the wireless communication system 1.

Hereinafter, examples of the LTE system 30 and the 3G system 40 are assumed to be a system confirming to 3GPP and a W-CDMA system, respectively. Alternatively, the LTE system 30 and the 3G system 40 are not limited to the above and may be any systems confirming to other standards.

An example of the LTE system 30 is a node that deals with positional information for LTE and that is exemplified by an E-SMLC or a MME defined in 3GPP, or is alternatively an entire system consisting of the above nodes.

The LTE system 30 is capable of wirelessly communicating with, for example, a mobile station 5-1 and includes an indoor LTE wireless base station (hereinafter also referred to as an eNB or a base station) 4-1, a Mobility Management Entity (MME) 7, and an E-SMLC 8. These functional units are typical in an LTE system, so description of the configurations and the functions thereof is omitted here.

The LTE system 30 may include one or more radio-wave amplifiers 203-1 such as repeaters interposed between the mobile station 5-1 and the base station 4-1. A radio-wave amplifier 203-1 amplitudes radio wave sent from the base station 4-1 and transmits the amplified radio wave. The base station 4-1 holds information of each radio-wave amplifier 203-1 accommodated in the area covered by the base station 4-1.

An example of the 3G system 40 is a node such as SMLC that deals with positional information for 3G or a 3G node such as an MSC and RNC, or is alternatively an entire system consisting of the above nodes.

The 3G system 40 is capable of wirelessly communicating with, for example, a mobile station 5-2 and includes a 3G base station (hereinafter also referred to as a base station) 4-2, an RNC 6, an MSC 7', and an SMLC 8'. These functional units are typical in a 3G system, so description of the configurations and the functions thereof is omitted here.

The 3G system 40 may include one or more radio-wave amplifiers 203-2 such as repeaters interposed between the mobile station 5-2 and the base station 4-2. A radio-wave amplifier 203-2 amplitudes radio wave sent from the base station 4-2 and transmits the amplified radio wave. The base station 4-2 holds information of each radio-wave amplifier 203-2 accommodated in the area covered by the base station 4-2.

A mobile station 5 notifies a base station 4 of positional information of the mobile station 5 and communication quality information (e.g., a communication frequency, reception strength, and a Pathloss value) serving as measured communication quality information.

The communication path determining unit 9 includes a collector (obtainer) 10, an indoor/outdoor determiner 22, a radio communication quality estimator (communication quality estimator) 23, and a communication path determiner (communication improvement candidate determiner) 24. The functions and the elements of these functional blocks are the same as those of the first embodiment, so repetitious description is omitted here.

A mobile terminal 5 may be communicable with either one of the LTE system 30 and the 3G system 40, or may be a hybrid (dual) mobile station that is communicable with both the LTE system 30 and the 3G system 40.

The mobile station 5 may be able to obtain radio waves from a GPS system 200, an indoor small wireless base station 201, and a WiFi router 202.

(2-2) Functions and Operations

Next, description will now be made in relation to the function and the operation of the communication path determining unit 9 according to an example of the second embodiment.

The communication path determining unit 9 identifies an area and a path to be a candidate for improving the communication quality thereof through the following three procedures, which are however roughly categorized.

1. Obtaining communication quality information representing measured communication quality information from a mobile station 5, and storing the obtained information into a database;

2. Estimating communication quality based on positional information obtained from the mobile station 5; and 3. Determining a communication path.

Hereinafter, these three procedures will now be summarized. The functions and the configurations of the respective functional blocks that participate in the following procedures are the same as those of the first embodiment except for the absence of the to-be-improved area determiner 26, so repetitious description is omitted here.

(2-2-1) Obtaining Communication Quality Information Representing Measured Communication Quality Information from Mobile Station 5, and Storing Obtained Information into Database The procedure records mobile station information (positional information, measured communication quality information) represented by radio quality information (e.g., a communication frequency, a Pathloss value); base station information (e.g., a transmission power, a tilt angle, a sector angle); and radio-wave capturing status of wireless LAN such as WiFi to thereby configure a database to be used by the analyzer 20.

To begin with, an LTE data transmitter/receiver 11 of the collector 10 included in the communication path determining unit 9 receives information (positional information, radio quality information, and base station information) of the mobile station 5 being in LTE communication from an LTE data transmitter/receiver 31 of the LTE system 30. In response to receiving the mobile station information, the LTE data transmitter/receiver 11 transmits a request of obtaining a radio-wave capturing status of wireless LAN such as WiFi.

The LTE system 30 corresponds to, for example, a node, such as an E-SMLC or an MME, that deals with positional information for the LTE or an entire system consisting of such nodes.

A 3G data transmitter/receiver 12 of the collector 10 included in the communication path determining unit 9 receives information (positional information, radio quality information, and base station information) of the mobile station 5 being in 3G communication from a 3G data transmitter/receiver 41 of the 3G system 40. Upon receipt pf the mobile station information, the 3G data transmitter/receiver 12 transmits a request of obtaining a radio-wave capturing status of wireless LAN such as WiFi.

The 3G system 40 corresponds to, for example, a node, such as ab SMLC defined in 3GPP, that deals with positional information for 3G or a 3G node, such as an MSC or RNC, or an entire system consisting of such nodes.

The DB register 13 stores the mobile station information received from the LTE system 30 and/or the 3G system 40 into the measured value DB 14 and also stores the base station information into the base station information DB 15.

(2-2-2) Estimating Communication Quality Based on Positional Information

This procedure estimates a communication quality (hereinafter called estimated communication quality) from the information obtained from the mobile station 5 using a propagation-loss estimation expression.

To begin with, the path searcher 21 of the analyzer 20 included in the communication path determining unit 9 obtains the positional information of the mobile station 5 and the base station 4 from the measured value DB 14, and sends the radio communication quality estimator 23 the search result for the communication path and the state of the presence of buildings on the path.

Likewise the first embodiment, the path searcher 21 is a functional element including a general map system installed therein.

The indoor/outdoor determiner 22 obtains the radio-wave capturing status of the wireless LAN such as WiFi from the measured value DB 14, determines whether the mobile station 5 is located indoor or outdoor, and sends the radio communication quality estimator 23 the result of the determination. The indoor/outdoor determination is carried out in the same manner as made in the above first embodiment, so repetitious description is omitted here.

The radio communication quality estimator 23 estimates the propagation loss (i.e., estimated communication quality) of the mobile station 5 on the basis of the path information identified by the path searcher 21 and the information received from the indoor/outdoor determiner 22 using the propagation-loss estimation expression. The propagation-loss estimation expression used here can be the same as that of the first embodiment, so repetitious description is omitted here.

(2-2-3) Determining Communication Path

This procedure determines the communication path of the mobile station 5 from the measured real communication quality value obtained and the estimated communication quality value calculated in the above processing.

First of all, the communication path determiner 24 of the analyzer 20 included in the communication path determining unit 9 determines, on the basis of radio communication quality estimated by the radio communication quality estimator 23 and the measured real value stored in the measured value DB 14, whether the mobile station 5 is in a service area of the radio-wave amplifier 203 such as a repeater. If the mobile station 5 is within the service area, the communication path determiner 24 issues a search request to the radio-wave amplifier searcher 16.

In response to receiving the search request, the radio-wave amplifier searcher 16 issues a request for searching for a radio-wave amplifier to an LTE radio wave amplifier searcher 32 or a 3G radio wave amplifier searcher 42. In response to receiving the request for searching for a radio-wave amplifier, the LTE radio wave amplifier searcher 32 or the 3G radio wave amplifier searcher 42 searches for any radio-wave amplifier 203 within the local sector, and notifies the radio-wave amplifier searcher 16 of the radio-wave amplifier information (e.g., positional information, a tilt angle, a sector orientation). The radio-wave amplifier searcher 16 notifies the communication path determiner 24 of the search result. Using the received radio-wave amplifier information (e.g., positional information, a tilt angle, a sector orientation), the communication path determiner 24 determines the real communication path.

When a low communication quality area exits, the communication path determiner 24 registers the low communication quality area as a candidate for area to be improved into the to-be-improved area DB 25. When the mobile station 5 is in the service area of a radio-wave amplifier 203 such as a repeater, the communication path determiner 24 registers the radio-wave amplifier 203 into the base station information DB 15. The to-be-improved area DB 25 accumulates information of to-be-improved areas obtained from multiple users.

As discussed above, the communication path determining unit 9 of an example of the second embodiment can easily determine the communication path in the wireless communication system 1.

Alternatively, the communication path can be determined only from an obtainable propagation loss value included in the Measurement Report that the mobile station 5 transmits when the location of the mobile station 5 is being registered.

Comparing the Passloss value estimated from the positional information of the mobile station 5 and the measured real pathloss value makes it possible to determine whether a radio-wave amplifier 203 such as a repeater is interposed. If there is a possibility that a radio-wave amplifier 203 is interposed, the base station 4 is instructed to search for a radio-wave amplifier in the sector under the control of the base station 4 to detect a radio-wave amplifier 203 that has not been registered yet, which is then registered in the base station.

The indoor/outdoor determination is made on the basis of the feature of an indoor mobile station 5 (for example, the status of capturing radio wave of indoor service, the radio wave strength of the GPS) in addition to the map data, which improves the accuracy of the indoor/outdoor determination and further improves the accuracy of an estimated Pathloss value.

Furthermore, the loss propagation expression additionally uses a correction value, based on the rate occupied by the building, and a building entry loss, which can further improve the accuracy of the estimation of the loss.

The hardware configuration of the communication path determining unit 9 according to an example of the second embodiment is the same as that of the first embodiment depicted in FIG. 23, so repetitious illustration and description are omitted here.

As an example, the communication path determining unit 9 is incorporated in one of a radio network controller RNC 6 of the 3G system 40, a superordinate device thereof, an outdoor LTE wireless base station eNodeB 4-1 of the LTE system 30, and a superordinate device thereof. These devices are archived by the information processing apparatus 50 having a hardware configuration illustrated in, for example, FIG. 23.

The CPU 51 of the information processing apparatus 50 executing a program for determining a communication path functions as the DB register 13, the indoor/outdoor determiner 22, the radio communication quality estimator 23, and the communication path determiner 24.

The program for determining the communication path determines a communication path in the wireless communication system 1 including base stations 4 and mobile stations 5. Specifically, the program instructs a computer to execute steps of: obtaining measured communication quality information and positional information from a mobile station 5; estimating communication quality from the positional information obtained from the mobile station 5; and determining a communication path from the estimated communication quality and the measured communication quality information.

The program (for determining a communication path) that achieves the functions of the DB register 13, the indoor/outdoor determiner 22, the radio communication quality estimator 23, and the communication path determiner 24 is provided in the form of being recorded in a tangible and non-transient computer-readable storage medium, such as a flexible disk, a CD (e.g., CD-ROM, CD-R, and CD-RW), a DVD (DVD-ROM, DVD-RAM, DVD-R, DVD+R, DVD-RW, and DVD+RW), a magnetic disk, an optical disk, and an magneto-optical disk. A computer reads the program from the storage medium and stores the read program in an internal or external storage device for future use. Alternatively, the program may be recorded in a recording device (storage medium), such as a magnetic disk, an optical disk, or a magneto-optical disk, and may be provided from the recording device to the computer via a communication path.

In achieving the functions of the DB register 13, the radio communication quality estimator 23, and the communication path determiner 24, the program stored in a non-illustrated internal storage device (corresponding to the RAM 52 or the ROM of the information processing apparatus 50 in the second embodiment) is executed by the microprocessor (corresponding to the CPU 51 in the second embodiment) of the computer. At that time, the computer may read the program stored in the storage medium and may execute the program.

In the second embodiment, a computer is a concept of a combination of hardware and an operating system (OS), and means hardware which operates under control of the OS. Otherwise, if a program does not need an OS but does operate hardware independently of an OS, the hardware itself corresponds to the computer. Hardware includes at least a microprocessor such as a CPU and means to read a computer program recorded in a storage medium. In the second embodiment, the information processing apparatus 50 has a function of a computer.

The HDD 51 or the external database 55 of the information processing apparatus 50 functions as the measured value DB 14, the base station information DB 15, the path searcher 21, and the to-be-improved area DB 25.

The I/F 54 of the information processing apparatus 50 functions as the LTE data transmitter/receiver 11, the 3G data transmitter/receiver 12, and the radio-wave amplifier searcher 16.

Alternatively to the above association of the respective functional blocks with hardware elements, the functional blocks may be achieved by different hardware elements.

Some of the above functional blocks may be dispersed in multiple units.

The communication path determining unit 9 according to an example of the second embodiment brings the following advantages.

Calculating the communication path and the communication quality from the positional information of mobile station 5 and the base station 4 and the radio quality that are obtained from the mobile station 5 makes it possible to easily determine a communication path with high accuracy, eliminating the need for measurement at the site by the operator.

Alternatively, the communication path can be determined only from an obtainable propagation loss value included in the Measurement Report that the mobile station 5 transmits when the location of the mobile station 5 is being registered.

Comparing the Passloss value estimated from the positional information of the mobile station 5 with the measured real pathloss value makes it possible to determine whether a radio-wave amplifier 203 such as a repeater is interposed. If there is a possibility that a radio-wave amplifier 203 is interposed, the base station 4 is instructed to search for a radio-wave amplifier in the sector under the control of the base station 4 to detect a radio-wave amplifier 203 that has not been registered yet, which is then registered in the base station.

The indoor/outdoor determination is made on the basis of the feature of an indoor mobile station 5 (for example, the status of capturing radio wave of indoor service, the radio wave strength of the GPS) in addition to the map data, which improves the accuracy of the indoor/outdoor determination and further improves the accuracy of an estimated Pathloss value.

Furthermore, the loss estimation expression additionally uses a correction value, based on the rate occupied by the building, and a building entry loss, which can further improve the accuracy of the estimation of the loss.

(3) Miscellaneous

The present invention should by no means be limited to the foregoing embodiments and various changes and modifications can be suggested without departing from the gist of the present invention.

For example, the description of the foregoing embodiments are applied to the wireless communication system 1 including the 30 LTE system 30 and the 3G system 40. Alternatively, the wireless communication system 1 may include a radio communication system except for the LTE system 30 and the 3G system 40.

Further alternatively, the wireless communication system 1 may include either one of the LTE system 30 and 3G system 40.

The management apparatus, the method of identifying a candidate for improving communication quality, a non-transitory storage medium having stored therein a program for identifying a candidate for improving communication quality, and a wireless communication system that are disclosed herein bring at least an advantage of easily identifying a candidate for improving communication quality with high accuracy, eliminating the need for measurement at the site by the operator.

The communication path determining unit, the method of determining a communication path, and a non-transitory storage medium having stored therein a program for determining a communication path that are disclosed herein bring at least an advantage of easily determining a communication path to improve radio quality with high accuracy, eliminating the need for measurement at the site by the operator.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A management apparatus that identifies a candidate for improving communication quality in a wireless communication system including a base station and a mobile station, the management apparatus comprising:
   an obtainer that obtains measured communication quality information and positional information from the mobile station;
   a communication quality estimator that estimates a communication quality based on the positional information obtained from the mobile station;
   a communication path determiner that determines whether there is any radio-wave amplifier present on a communication path using the estimated communication quality estimated by the communication quality estimator and the measured communication quality information obtained by the obtainer; and
   a communication quality improvement candidate determiner that identifies the candidate for improving communication quality related to the communication path determined by the communication path determiner, the candidate being based on communication quality.

2. The management apparatus according to claim 1, wherein
   in response to receiving the measured communication quality information and the positional information from the mobile station, the obtainer further obtains status of radio wave from a second communication system having an area narrower than that of the wireless communication system.

3. The management apparatus according to claim 1, further comprising an indoor/outdoor determiner that determines whether the mobile station is located indoor or outdoor,
   wherein the communication quality estimator additionally uses the result of the determining by the indoor/outdoor determiner to estimate the communication quality.

4. The management apparatus according to claim 3, further comprising an indoor/outdoor determiner determines the mobile station is located indoor or outdoor using the status of radio wave from the second system.

5. The management apparatus according to claim 3, further comprising an indoor/outdoor determiner determines the mobile station is located indoor or outdoor using status of radio wave that the mobile station receives from a global positioning system (GPS).

6. The management apparatus according to claim 3, further comprising an indoor/outdoor determiner determines the mobile station is located indoor or outdoor using status of radio wave that the mobile station receives from a small indoor wireless station.

7. The management apparatus according to claim 3, wherein the communication quality estimator additionally uses the determining by the indoor/outdoor determiner to estimate a propagation loss using a propagation-loss estimation expression.

8. The management apparatus according to claim 1, wherein:
when there is a radio-wave amplifier, the communication path determiner determines the communication path disposes thereon the radio-wave amplifier.

9. The management apparatus according to claim 1, wherein the communication path determiner determines, from an actual propagation loss between the base station and the mobile station and an estimated propagation loss estimated by the communication quality estimator, whether the radio-wave amplifier is present on the communication path.

10. The management apparatus according to claim 1, wherein when it is determined that the radio-wave amplifier is present, the communication path determiner causes the base station to search for a radio-wave amplifier in a sector of the base station.

11. The management apparatus according to claim 10, wherein when the radio-wave amplifier is not registered in the base station, the communication path determiner instructs the base station to register the radio-wave amplifier therein.

12. The management apparatus according to claim 1, wherein the communication quality improvement candidate determiner determines, among a plurality of the communication paths determined by the communication path determiner, a point having the largest propagation loss as the communication quality improvement candidate.

13. The management apparatus according to claim 1, wherein the wireless communication system is at least one of a 3G system or a Long Term Evolution (LTE) system.

14. The management apparatus according to claim 13, being incorporated in one of a Radio Network Controller (RNC) of the 3G system, a superordinate device of the RNC, an outdoor LTE wireless base station (eNodeB) of the LTE system, and a superordinate device of the eNodeB.

15. A method of identifying a candidate for improving communication quality in a wireless communication system including a base station and a mobile station, the method comprising:
obtaining measured communication quality information and positional information from the mobile station;
estimating communication quality based on the positional information obtained from the mobile station;
determining whether there is any radio-wave amplifier present on a communication path using the estimated communication quality and the measured communication quality information obtained; and
identifying the candidate for improving quality related to the determined communication path, the candidate being based on communication quality.

16. A non-transitory computer-readable storage medium having stored therein a program for causing a computer to execute a process for identifying a candidate for improving communication quality in a wireless communication system including a base station and a mobile station, the process comprising:
obtaining measured communication quality information and positional information from the mobile station;
estimating communication quality based on the positional information obtained from the mobile station;
determining whether there is any radio-wave amplifier present on a communication path using the estimated communication quality and the measured communication quality information; and
identifying the candidate for improving communication quality related to the determined communication path, the candidate being based on communication quality.

17. An apparatus for determining a communication path in a wireless communication system including a base station and a mobile station, the apparatus comprising:
an obtainer that obtains measured communication quality information and positional information from the mobile station;
a communication quality estimator that estimates a communication quality based on the positional information obtained from the mobile station; and
a communication path determiner that determines whether there is any radio-wave amplifier present on a communication path using the estimated communication quality estimated by the communication quality estimator and the measured communication quality information obtained by the obtainer.

18. A method of determining a communication path in a wireless communication system including a base station and a mobile station, the method comprising:
obtaining measured communication quality information and positional information from the mobile station;
estimating communication quality based on the positional information obtained from the mobile station; and
determining whether there is any radio-wave amplifier present on a communication path using the estimated communication quality and the measured communication quality information.

19. A non-transitory computer-readable storage medium having stored therein a program for causing a computer to execute a process to determine a communication path in a wireless communication system including a base station and a mobile station, the process comprising:
obtaining measured communication quality information and positional information from the mobile station;
estimating communication quality based on the positional information obtained from the mobile station; and
determining whether there is any radio-wave amplifier present on a communication path using the estimated communication quality and the measured communication quality information.

20. A wireless communication system including a base station and a mobile station comprising:
an obtainer that obtains measured communication quality information and positional information from the mobile station;
a communication quality estimator that estimates a communication quality based on the positional information obtained from the mobile station;
a communication path determiner that determines whether there is any radio-wave amplifier present on a communication path using the estimated communication quality estimated by the communication quality estimator and the measured communication quality information obtained by the obtainer; and a communication quality improvement candidate determiner that identifies the candidate for improving communication quality related to the communication path determined by the communication path determiner, the candidate being based on communication quality.

* * * * *